US012051133B2

(12) United States Patent
Gasselin de Richebourg et al.

(10) Patent No.: US 12,051,133 B2
(45) Date of Patent: Jul. 30, 2024

(54) COLOR TREATMENT AND COLOR NORMALIZATION FOR DIGITAL ASSETS

(71) Applicant: Apple Inc., Cupertino, CA (US)

(72) Inventors: Jacques P. Gasselin de Richebourg, San Jose, CA (US); Sanaa Squalli, Paris (FR); Etienne Guerard, Cupertino, CA (US); Stephen J. Ward, Fremont, CA (US); Piotr J. Stanczyk, San Francisco, CA (US); Graham R. Clarke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 112 days.

(21) Appl. No.: 17/657,049

(22) Filed: Mar. 29, 2022

(65) Prior Publication Data
US 2022/0383559 A1   Dec. 1, 2022

Related U.S. Application Data

(60) Provisional application No. 63/195,574, filed on Jun. 1, 2021.

(51) Int. Cl.
| G06T 13/20 | (2011.01) |
| G06F 16/68 | (2019.01) |
| G06F 16/683 | (2019.01) |
| G06T 7/90 | (2017.01) |
| G06T 11/00 | (2006.01) |
| G06T 13/80 | (2011.01) |
| G10H 1/36 | (2006.01) |

(52) U.S. Cl.
CPC .......... *G06T 11/001* (2013.01); *G06F 16/683* (2019.01); *G06F 16/686* (2019.01); *G06T 7/90* (2017.01); *G06T 13/205* (2013.01); *G06T 13/80* (2013.01); *G10H 1/368* (2013.01); *G06T 2207/20081* (2013.01); *G06T 2207/20084* (2013.01); *G10H 2210/031* (2013.01)

(58) Field of Classification Search
None
See application file for complete search history.

(56) References Cited

U.S. PATENT DOCUMENTS 10,552,977 B1 *   2/2020   Theis ................. G06T 7/70
10,936,853 B1 *   3/2021   Sethi ................. G06V 40/162
(Continued)

*Primary Examiner* — Joni Hsu
(74) *Attorney, Agent, or Firm* — Blank Rome LLP

(57) ABSTRACT

Devices, methods, and non-transitory program storage devices are disclosed to provide for the application of color treatments and/or color normalization operations to digital assets (DAs) in a set of DAs that are to be displayed as part of a multimedia presentation. The determination of the color treatment may be based on comparing one or more characteristics of an audio media item associated with the set of DAs to a corresponding one or more characteristics of a plurality of predetermined color treatments. Color normalization may be applied to the set of DAs prior to the determined color treatment. Techniques disclosed herein may also determine one or more parameters for a multimedia presentation of the set of DAs based on a characteristic of the associated audio media item. The parameters for the multimedia presentation may comprise one or more of: preferred DA sequences, portions, clusters, layouts, themes, transition types, or transition durations.

18 Claims, 10 Drawing Sheets

(56) References Cited

U.S. PATENT DOCUMENTS

| | | | |
|---|---|---|---|
| 11,102,606 B1* | 8/2021 | Milne | H04S 7/301 |
| 2005/0044112 A1* | 2/2005 | Yamamoto | G06F 16/48 |
| 2009/0067605 A1* | 3/2009 | Holm | G06T 13/205 |
| | | | 379/207.16 |
| 2011/0195388 A1* | 8/2011 | Henshall | G09B 5/062 |
| | | | 434/317 |
| 2018/0349386 A1* | 12/2018 | Circlaeys | G06F 16/44 |
| 2019/0303669 A1* | 10/2019 | Spooner | G06N 3/08 |
| 2021/0074036 A1* | 3/2021 | Fuchs | G06T 11/006 |
| 2021/0082091 A1* | 3/2021 | Jirsa | G06T 5/007 |
| 2021/0233239 A1* | 7/2021 | Li | G06T 5/009 |

\* cited by examiner

COLOR TREATMENT AND COLOR NORMALIZATION FOR DIGITAL ASSETS

TECHNICAL FIELD

This disclosure relates generally to the field of image processing. More particularly, but not by way of limitation, it relates to techniques for applying color normalization, selected color treatments, and/or transitions to a set of digital assets (e.g., images, videos, etc.) to be included in a multimedia presentation based, at least in part, on a characteristic of an audio media item (e.g., a song, soundtrack, etc.) associated with the set of digital assets.

BACKGROUND

Modern consumer electronics have enabled users to create, purchase, and amass considerable amounts of digital assets, or "DAs." For example, a computing system (e.g., a smartphone, a stationary computer system, a portable computer system, a media player, a tablet computer system, a wearable computer system or device, etc.) can store or have access to a collection of digital assets (also referred to as a DA collection) that includes hundreds or thousands of DAs.

Managing a DA collection can be a resource-intensive exercise for users. For example, retrieving multiple DAs representing an important moment or event in a user's life from a sizable DA collection can require the user to sift through many irrelevant DAs. This process can be arduous and unpleasant for many users. A digital asset management (DAM) system can assist with managing a DA collection. A DAM system represents an intertwined system incorporating software, hardware, and/or other services in order to manage, store, ingest, organize, retrieve, and present DAs in a DA collection. An important building block for at least one commonly available DAM system is a database. Databases comprise data collections that are organized as schemas, tables, queries, reports, views, and other objects. Exemplary databases include relational databases (e.g., tabular databases, etc.), distributed databases that can be dispersed or replicated among different points in a network, and object-oriented programming databases that can be congruent with the data defined in object classes and subclasses.

However, one problem associated with using databases for digital asset management is that the DAM system can become resource-intensive to store, manage, and update. That is, substantial computational resources may be needed to manage the DAs in the DA collection (e.g., processing power for performing queries or transactions, storage memory space for storing the necessary databases, etc.). Another related problem associated with using databases is that DAM cannot easily be implemented on a computing system with limited storage capacity without managing the assets directly (e.g., a portable or personal computing system, such as a smartphone or a wearable device). Consequently, a DAM system's functionality is generally provided by a remote device (e.g., an external data store, an external server, etc.), where copies of the DAs are stored, and the results are transmitted back to the computing system having limited storage capacity.

Thus, according to some DAM embodiments, a DAM may further comprise a knowledge graph metadata network (also referred to herein as simply a "knowledge graph" or "metadata network") associated with a collection of digital assets (i.e., a DA collection). The metadata network can comprise correlated metadata assets describing characteristics associated with digital assets in the DA collection. Each metadata asset can describe a characteristic associated with one or more digital assets (DAs) in the DA collection. For example, a metadata asset can describe a characteristic associated with multiple DAs in the DA collection, such as the location, day of week, event type, etc., of the one or more associated DAs. Each metadata asset can be represented as a node in the metadata network. A metadata asset can be correlated with at least one other metadata asset. Each correlation between metadata assets can be represented as an edge in the metadata network that is between the nodes representing the correlated metadata assets. According to some embodiments, the metadata networks may define multiple types of nodes and edges, e.g., each with their own properties, based on the needs of a given implementation.

In addition to the aforementioned difficulties that a user may face in managing a large DA collection (e.g., locating and/or retrieving multiple DAs representing an important moment, event, person, location, theme, or topic in a user's life), users may also struggle to determine (or be unable to spend the time it would take to determine) which DAs would be meaningful to view (e.g., in the form of a multimedia presentation, such as a slideshow) and/or share with third parties, e.g., other users of similar DAM systems and/or social contacts of the user. Users may also not want to spend the time it would take to determine suitable DA sequences, clusters, layouts, themes, transition types and durations, edits to the duration or content of individual DAs, etc., for constructing such a multimedia presentation of a user's DAs. Further, users may struggle to determine a suitable audio media item (e.g., one or more songs to be used as a "soundtrack") to associate with the playback of a set of DAs that is to be included in a multimedia presentation. Finally, users may struggle to determine (or not even be cognizant of) what types of color treatments (e.g., color normalization and/or color grading operations) would help enhance the look and feel of the set of DAs to be displayed in the multimedia presentation.

Thus, there is a need for methods, apparatuses, computer readable media, and systems to provide users with more intelligent and automated DA color treatment suggestions (and/or other content-related suggestions) for multimedia presentations of a set of DAs, e.g., based on a selected audio media item associated with the set of DAs and/or one or more properties of the DAs in the set of DAs.

SUMMARY

Devices, methods, and non-transitory program storage devices (NPSDs) are disclosed herein to provide for the application of color treatments and/or color normalization operations to DAs in a set of DAs that are to be displayed as part of a multimedia presentation. In some embodiments, the determination of the color treatment may be based on comparing one or more characteristics of an audio media item associated with the set of DAs to a corresponding one or more characteristics of a plurality of predetermined color treatments. In some such embodiments, color normalization may be applied to the set of DAs prior to the application of the determined color treatment. The techniques disclosed herein may also determine one or more parameters for a multimedia presentation of the set of DAs based on a characteristic of an associated audio media item. In some embodiments, the determined parameters for the multimedia presentation may comprise one or more of: preferred DA sequences, clusters, layouts, themes, transition types or transition durations, edits to the duration or content of individual DAs, etc.

Thus, according to some embodiments, there is provided a device, comprising: a memory; a display; and one or more processors operatively coupled to the memory, wherein the one or more processors are configured to execute instructions causing the one or more processors to: obtain a first set of digital assets; obtain a first audio media item associated with the first set of digital assets, wherein the first audio media item comprises at least a first audio characteristic metadata item; determine a first color treatment, wherein the determination of the first color treatment is based, at least in part, on the first audio characteristic metadata item of the first audio media item; and apply the determined first color treatment to at least one of the digital assets of the first set of digital assets.

According to other embodiments, there is provided a device, comprising: a memory; a display; and one or more processors operatively coupled to the memory, wherein the one or more processors are configured to execute instructions causing the one or more processors to: obtain a first set of digital assets; obtain a first audio media item associated with the first set of digital assets, wherein the first audio media item comprises at least a first audio characteristic metadata item; and determine one or more parameters for a multimedia presentation of the first set of digital assets based, at least in part, on the first audio characteristic metadata item of the first audio media item.

According to still other embodiments, there is provided a device, comprising: a memory; a display; and one or more processors operatively coupled to the memory, wherein the one or more processors are configured to execute instructions causing the one or more processors to: obtain a first digital image; apply the first digital image to a first deep neural network (DNN), wherein the first DNN has been trained to learn a first target image style, wherein the first DNN is configured to determine a first set of image parameter modifications for a first set of image parameters of the first digital image, and wherein application of the determined first set of image parameter modifications to the first digital image would cause the first digital image to approximate the first target style; and apply the determined first set of image parameter modifications to the first digital image.

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image processing methods are also disclosed herein, in accordance with the device and NPSD embodiments disclosed herein.

DETAILED DESCRIPTION

Figure 1:
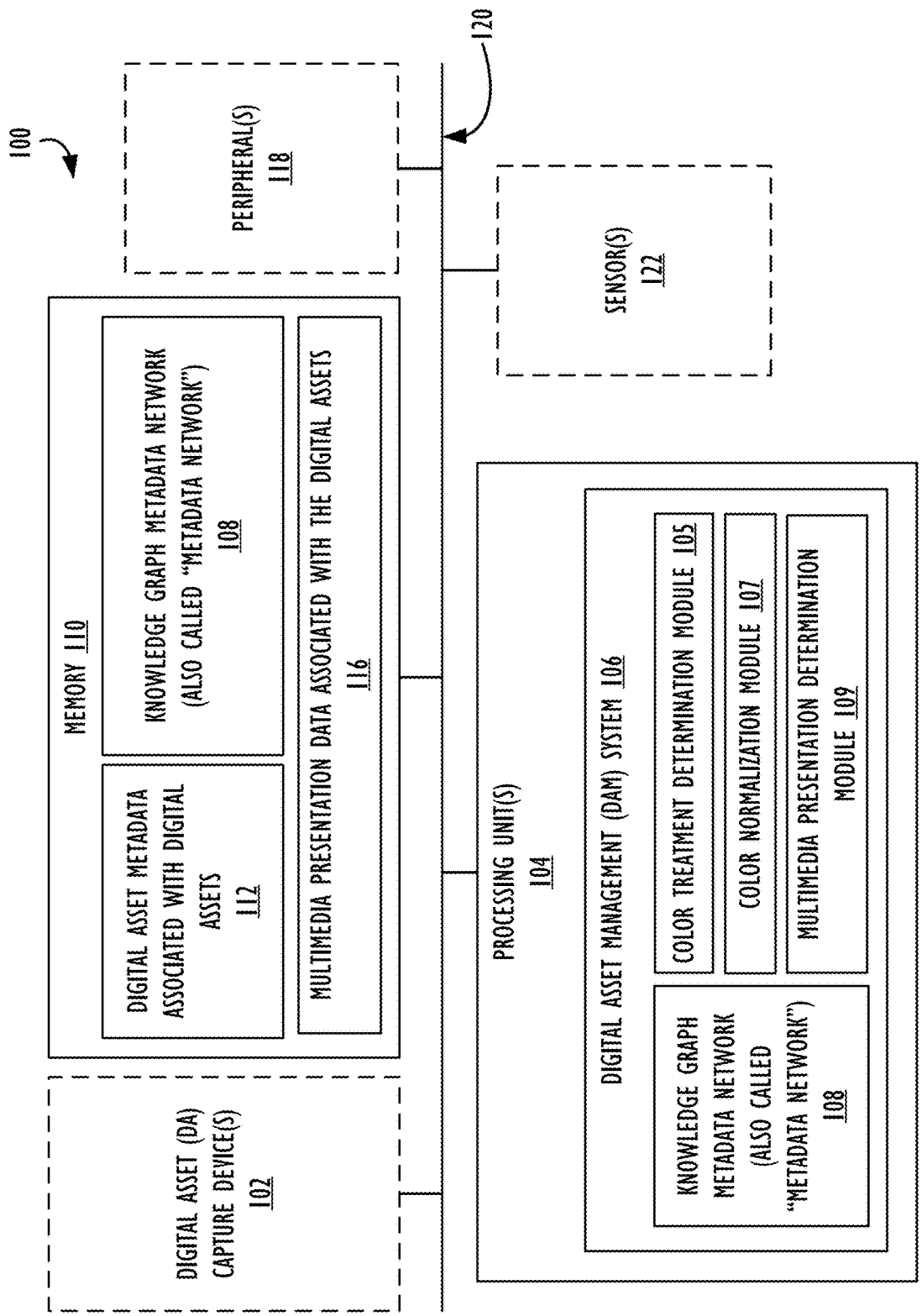
FIG. 1 illustrates, in block diagram form, an asset management processing system that includes electronic components for performing digital asset management (DAM), according to one or more embodiments.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Embodiments set forth herein can assist with improving computer functionality by enabling computing systems that use one or more embodiments of the digital asset management (DAM) systems described herein. Such computing systems can implement DAM to assist with reducing or eliminating the need for users to manually determine what DAs to include in multimedia presentations and how such DAs should be presented, e.g., in terms of multimedia presentation parameters, such as DA layout, clustering, sequencing, transitioning, and selection of an appropriate associated audio media item (e.g., a "soundtrack" for the multimedia presentation)—as well as in terms of selecting a color treatment for the DAs that will complement the content of the DAs, the parameters of the multimedia presentation, and/or the audio characteristics of the selected audio media item.

This reduction or elimination can, in turn, assist with minimizing wasted computational resources (e.g., memory, processing power, computational time, etc.) that may be associated with using exclusively relational databases for DAM. For example, performing DAM via relational databases may include external data stores and/or remote servers (as well as networks, communication protocols, and other components required for communicating with external data stores and/or remote servers). In contrast, DAM performed as described herein (i.e., leveraging a knowledge graph metadata network) can occur locally on a device (e.g., a portable computing system, a wearable computing system, etc.) without the need for external data stores, remote servers, networks, communication protocols, and/or other components required for communicating with external data stores and/or remote servers.

Moreover, by automating the process of suggesting color treatments and/or presentation parameters for multimedia presentations automatically generated based on information stored in a knowledge graph metadata network, users do not have to perform as much manual examination of their (often quite large) DA collections to determine what DAs might be appropriate to share together as part of multimedia presentation and/or how such DAs might need to be color corrected, color modified, and/or sequenced for inclusion in such a multimedia presentation based, e.g., on a characteristic of an audio media item associated with the multimedia presentation. Consequently, at least one embodiment of DAM described herein can assist with reducing or eliminating the additional computational resources (e.g., memory, processing power, computational time, etc.) that may be associated with a user's searching, sorting, sequencing, and/or color modifying DAs obtained manually from external relational databases in order to determine whether or not to include such DAs in multimedia presentations to be displayed to the user and/or shared with one or more third parties.

Exemplary Client Device for Digital Asset Management and Multimedia Presentation-Related Information Storage Turning now to FIG. 1, an asset management processing system, i.e., client device system 100, is illustrated that includes electronic components for performing digital asset management (DAM), according to one or more embodiments. The system 100 can be housed in single computing system, such as a desktop computer system, a laptop computer system, a tablet computer system, a server computer system, a mobile phone, a media player, a personal digital assistant (PDA), a personal communicator, a gaming device, a network router or hub, a wireless access point (AP) or repeater, a set-top box, or a combination thereof. Components in the system 100 can be spatially separated and implemented on separate computing systems that are operatively connected, as described in further detail below.

For one embodiment, the system 100 may include processing unit(s) 104, memory 110, a DA capture device(s) 102, sensor(s) 122, and peripheral(s) 118. For one embodiment, one or more components in the system 100 may be implemented as one or more integrated circuits (ICs). For example, at least one of the processing unit(s) 104, the DA capture device 102, the peripheral(s) 118, the sensor(s) 122, or the memory 110 can be implemented as a system-on-a-chip (SoC) IC, a three-dimensional (3D) IC, any other known IC, or any known IC combination. For another embodiment, two or more components in the system 100 are implemented together as one or more ICs. For example, at least two of the processing unit(s) 104, the DA capture device 102, the peripheral(s) 118, the sensor(s) 122, or the memory 110 are implemented together as an SoC IC. Each component of system 100 is described below.

As shown in FIG. 1, the system 100 can include processing unit(s) 104, such as CPUs, GPUs, other integrated circuits (ICs), memory, and/or other electronic circuitry. For one embodiment, the processing unit(s) 104 manipulate and/or process DA metadata associated with digital assets 112 or multimedia presentation data 116 associated with digital assets (e.g., preferred DA sequences, clusters, layouts, themes, transition types and durations, edits to the duration or content of individual DAs, etc.). The processing unit(s) 104 may include a digital asset management (DAM) system 106 for performing one or more embodiments of DAM, as described herein. For one embodiment, the DAM system 106 is implemented as hardware (e.g., electronic circuitry associated with the processing unit(s) 104, circuitry, dedicated logic, etc.), software (e.g., one or more instructions associated with a computer program executed by the processing unit(s) 104, software run on a general-purpose computer system or a dedicated machine, etc.), or a combination thereof.

The DAM system 106 can enable the system 100 to generate and use a knowledge graph metadata network (also referred to herein more simply as "knowledge graph" or "metadata network") 108 of the DA metadata 112 as a multidimensional network. Metadata networks and multidimensional networks that may be used to implement the various techniques described herein are described in further detail in, e.g., U.S. Non-Provisional patent application Ser. No. 15/391,269, entitled "Notable Moments in a Collection of Digital Assets," filed Dec. 27, 2016 ("the '269 application").

In one embodiment, the DAM system 106 can perform one or more of the following operations: (i) generate the metadata network 108; (ii) relate and/or present at least two DAs, e.g., as part of a moment or multimedia presentation, based on the metadata network 108; (iii) determine and/or present interesting DAs (or sets of DAs) in the DA collection to the user as viewing or sharing suggestions, based on the metadata network 108 and one or more other criterion; and (iv) select and/or present suggested sets of DAs (along with, optionally, color treatment options and/or audio media item soundtrack options for such sets of DAs) for inclusion into a multimedia presentation to be displayed to a user and/or to be shared with one or more third parties, e.g., based on a contextual analysis of the DAs included in the multimedia presentation. Additional details about the immediately preceding operations that may be performed by the DAM system 106 are described below and, particularly, in connection with FIGS. 6A-6C.

The DAM system 106 can obtain or receive a collection of DA metadata 112 associated with a DA collection. As used herein, a "digital asset," a "DA," and their variations refer to data that can be stored in or as a digital form (e.g., a digital file etc.). This digitalized data includes, but is not limited to, the following: image media (e.g., a still or animated image, etc.); audio media (e.g., a song, etc.); text media (e.g., an E-book, etc.); video media (e.g., a movie, etc.); and haptic media (e.g., vibrations or motions provided in connection with other media, etc.). The examples of digitalized data above can be combined to form multimedia (e.g., a computer animated cartoon, a video game, a presentation, etc.). A single DA refers to a single instance of digitalized data (e.g., an image, a song, a movie, etc.). Multiple DAs or a group of DAs refers to multiple instances of digitalized data (e.g., multiple images, multiple songs, multiple movies, etc.). Throughout this disclosure, the use of "a DA" refers to "one or more DAs" including a single DA and a group of DAs. For brevity, the concepts set forth in this document use an operative example of a DA as one or more images. It is to be appreciated that a DA is not so limited, and the concepts set forth in this document are applicable to other DAs (e.g., the different media described above, etc.).

As used herein, a "digital asset collection," a "DA collection," and their variations refer to multiple DAs that may be stored in one or more storage locations. The one or more storage locations may be spatially or logically separated as is known.

As used herein, "metadata," "digital asset metadata," "DA metadata," and their variations collectively refer to information about one or more DAs. Metadata can be: (i) a single instance of information about digitalized data (e.g., a time stamp associated with one or more images, etc.); or (ii) a grouping of metadata, which refers to a group comprised of multiple instances of information about digitalized data (e.g., several time stamps associated with one or more images, etc.). There may also be many different types of metadata associated with a collection of DAs. Each type of metadata (also referred to as "metadata type") describes one or more characteristics or attributes associated with one or more DAs. Further detail regarding the various types of metadata that may be stored in a DA collection and/or utilized in conjunction with a knowledge graph metadata network are described in further detail in, e.g., the '269 application, which was incorporated by reference above.

As used herein, "context" and its variations refer to any or all attributes of a user's device that includes or has access to a DA collection associated with the user, such as physical, logical, social, and other contextual information. As used herein, "contextual information" and its variations refer to metadata that describes or defines a user's context or a context of a user's device that includes or has access to a DA collection associated with the user. Exemplary contextual information includes, but is not limited to, the following: a predetermined time interval; an event scheduled to occur in a predetermined time interval; a geolocation visited during a particular time interval; one or more identified persons associated with a particular time interval; an event taking place during a particular time interval, or a geolocation visited during a particular time interval; weather metadata describing weather associated with a particular period in time (e.g., rain, snow, sun, temperature, etc.); season metadata describing a season associated with the capture of one or more DAs; relationship information describing the nature of the social relationship between a user and one or more third parties; or natural language processing (NLP) information describing the nature and/or content of an interaction between a user and one more third parties. For some embodiments, the contextual information can be obtained from external sources, e.g., a social networking application, a weather application, a calendar application, an address book application, any other type of application, or from any type of data store accessible via a wired or wireless network (e.g., the Internet, a private intranet, etc.).

Referring again to FIG. 1, for one embodiment, the DAM system 106 uses the DA metadata 112 to generate a metadata network 108. As shown in FIG. 1, all or some of the metadata network 108 can be stored in the processing unit(s) 104 and/or the memory 110. As used herein, a "knowledge graph," a "knowledge graph metadata network," a "metadata network," and their variations refer to a dynamically organized collection of metadata describing one or more DAs (e.g., one or more groups of DAs in a DA collection, one or more DAs in a DA collection, etc.) used by one or more computer systems. In a metadata network, there are no actual DAs stored—only metadata (e.g., metadata associated with one or more groups of DAs, metadata associated with one or more DAs, etc.). Metadata networks differ from databases because, in general, a metadata network enables deep connections between metadata using multiple dimensions, which can be traversed for additionally deduced correlations. This deductive reasoning generally is not feasible in a conventional relational database without loading a significant number of database tables (e.g., hundreds, thousands, etc.). As such, as alluded to above, conventional databases may require a large amount of computational resources (e.g., external data stores, remote servers, and their associated communication technologies, etc.) to perform deductive reasoning. In contrast, a metadata network may be viewed, operated, and/or stored using fewer computational resource requirements than the conventional databases described above. Furthermore, metadata networks are dynamic resources that have the capacity to learn, grow, and adapt as new information is added to them. This is unlike databases, which are useful for accessing cross-referred information. While a database can be expanded with additional information, the database remains an instrument for accessing the cross-referred information that was put into it. Metadata networks do more than access cross-referenced information—they go beyond that and involve the extrapolation of data for inferring or determining additional data. As alluded to above, the DAs themselves may be stored, e.g., on one or more servers remote to the system 100, with thumbnail versions of the DAs stored in system memory 110 and full versions of particular DAs only downloaded and/or stored to the system 100's memory 110 as needed (e.g., when the user desires to view or share a particular DA). In other embodiments, however, e.g., when the amount of onboard storage space and processing resources at the system 100 is sufficiently large and/or the size of the user's DA collection is sufficiently small, the DAs themselves may also be stored within memory 110, e.g., in a separate database, such as the aforementioned conventional databases.

The DAM system 106 may generate the metadata network 108 as a multidimensional network of the DA metadata 112. As used herein, a "multidimensional network" and its variations refer to a complex graph having multiple kinds of relationships. A multidimensional network generally includes multiple nodes and edges. For one embodiment, the nodes represent metadata, and the edges represent relationships or correlations between the metadata. Exemplary multidimensional networks include, but are not limited to, edge-labeled multigraphs, multipartite edge-labeled multigraphs, and multilayer networks.

In one embodiment, the metadata network 108 includes two types of nodes—(i) moment nodes; and (ii) non-moments nodes. As used herein, "moment" shall refer to a contextual organizational schema used to group one or more digital assets, e.g., for the purpose of displaying the group of digital assets to a user, according to inferred or explicitly-defined relatedness between such digital assets. For example, a moment may refer to a visit to coffee shop in Cupertino, California that took place on Mar. 26, 2018. In this example, the moment can be used to identify one or more DAs (e.g., one image, a group of images, a video, a group of videos, a song, a group of songs, etc.) associated with the visit to the coffee shop on Mar. 26, 2018 (and not with any other moment).

As used herein, a "moment node" refers to a node in a multidimensional network that represents a moment (as is described above). As used herein, a "non-moment node" refers a node in a multidimensional network that does not represent a moment. Thus, a non-moment node may refer to a metadata asset associated with one or more DAs that is not a moment, e.g., a node associated with a particular person, location, or multimedia presentation. Further details regarding the possible types of "non-moment" nodes that may be found in an exemplary metadata network may be found e.g., the '269 application, which was incorporated by reference above.

For one embodiment, the edges in the metadata network 108 between nodes represent relationships or correlations between the nodes. For one embodiment, the DAM system 106 updates the metadata network 108 as it obtains or receives new metadata 112 and/or determines new metadata 112 for the DAs in the user's DA collection.

The DAM system 106 can manage DAs associated with the DA metadata 112 using the metadata network 108 in various ways. For a first example, DAM system 106 may use the metadata network 108 to identify and present interesting sets of one or more DAs in a DA collection based on the correlations (i.e., the edges in the metadata network 108) between the DA metadata (i.e., the nodes in the metadata network 108) and one or more criterion. For this first example, the DAM system 106 may select the interesting DAs based on moment nodes in the metadata network 108. In some embodiments, the DAM system 106 may suggest that a user views and/or shares the one or more identified DAs with one or more third parties. For a second example, the DAM system 106 may use the metadata network 108 and other contextual information gathered from the system (e.g., the user's relationship to one or more third parties, a topic or types of scene identified in the DAs related to one or moments, etc.) to select and present a representative multimedia presentation including one or more DAs that the user may want to view and/or share with one or more third parties.

In some embodiments, the DAM system 106 can use a color treatment determination module 105 to determine one or more suggested color treatments for a given set of one or more DAs to be included in a particular multimedia presentation, as described below and, particularly, in connection with FIGS. 2-3. In some other embodiments, the DAM system 106 can use a color normalization module 107 to determine one or more suggested color normalization image modification operation to apply to a given set of one or more DAs to be included in a particular multimedia presentation, e.g., prior to the application of a determined color treatment, as described below and, particularly, in connection with FIG. 5. In still other embodiments, the DAM system 106 can use a multimedia presentation determination module 109 to determine one or more parameters for a particular multimedia presentation, as described below and, particularly, in connection with FIGS. 4A-4B.

The system 100 can also include memory 110 for storing and/or retrieving metadata 112, the metadata network 108, and/or multimedia presentation data 116 described by or associated with the metadata 112. The metadata 112, the metadata network 108, and/or the multimedia presentation data 116 can be generated, processed, and/or captured by the other components in the system 100. For example, the metadata 112, the metadata network 108, and/or the multimedia presentation data 116 may include data generated by, captured by, processed by, or associated with one or more peripherals 118, the DA capture device(s) 102, or the processing unit(s) 104, etc. The system 100 can also include a memory controller (not shown), which includes at least one electronic circuit that manages data flowing to and/or from the memory 110. The memory controller can be a separate processing unit or integrated in processing unit(s) 104.

The system 100 can include a DA capture device(s) 102 (e.g., an imaging device for capturing images, an audio device for capturing sounds, a multimedia device for capturing audio and video, any other known DA capture device, etc.). Device 102 is illustrated with a dashed box to show that it is an optional component of the system 100. For one embodiment, the DA capture device 102 can also include a signal processing pipeline that is implemented as hardware, software, or a combination thereof. The signal processing pipeline can perform one or more operations on data received from one or more components in the device 102. The signal processing pipeline can also provide processed data to the memory 110, the peripheral(s) 118 (as discussed further below), and/or the processing unit(s) 104.

The system 100 can also include peripheral(s) 118. For one embodiment, the peripheral(s) 118 can include at least one of the following: (i) one or more input devices that interact with or send data to one or more components in the system 100 (e.g., mouse, keyboards, etc.); (ii) one or more output devices that provide output from one or more components in the system 100 (e.g., monitors, printers, display devices, etc.); or (iii) one or more storage devices that store data in addition to the memory 110. Peripheral(s) 118 is illustrated with a dashed box to show that it is an optional component of the system 100. The peripheral(s) 118 may also refer to a single component or device that can be used both as an input and output device (e.g., a touch screen, etc.). The system 100 may include at least one peripheral control circuit (not shown) for the peripheral(s) 118. The peripheral control circuit can be a controller (e.g., a chip, an expansion card, or a stand-alone device, etc.) that interfaces with and is used to direct operation(s) performed by the peripheral(s) 118. The peripheral(s) controller can be a separate processing unit or integrated in processing unit(s) 104. The peripheral(s) 118 can also be referred to as input/output (I/O) devices 118 throughout this document.

The system 100 can also include one or more sensors 122, which are illustrated with a dashed box to show that the sensor can be optional components of the system 100. For one embodiment, the sensor(s) 122 can detect a characteristic of one or more environs. Examples of a sensor include, but are not limited to: a light sensor, an imaging sensor, an accelerometer, a sound sensor, a barometric sensor, a proximity sensor, a vibration sensor, a gyroscopic sensor, a compass, a barometer, a heat sensor, a rotation sensor, a velocity sensor, and an inclinometer.

For one or more embodiments, the system 100 also includes communication mechanism 120. The communication mechanism 120 can be, e.g., a bus, a network, or a switch. When the technology 120 is a bus, the technology 120 is a communication system that transfers data between components in system 100, or between components in system 100 and other components associated with other systems (not shown). As a bus, the technology 120 includes all related hardware components (wire, optical fiber, etc.) and/or software, including communication protocols. For one embodiment, the technology 120 can include an internal bus and/or an external bus. Moreover, the technology 120 can include a control bus, an address bus, and/or a data bus for communications associated with the system 100. For one embodiment, the technology 120 can be a network or a switch. As a network, the technology 120 may be any network such as a local area network (LAN), a wide area network (WAN) such as the Internet, a fiber network, a storage network, or a combination thereof, wired or wireless. When the technology 120 is a network, the components in the system 100 do not have to be physically co-located. Separate components in system 100 may be linked directly over a network even though these components may not be physically located next to each other. For example, two or more of the processing unit(s) 104, the communication technology 120, the memory 110, the peripheral(s) 118, the sensor(s) 122, and the DA capture device(s) 102 may be in distinct physical locations from each other and be communicatively coupled via the communication technology 120, which may be a network or a switch that directly links these components over a network.

Figure 2:
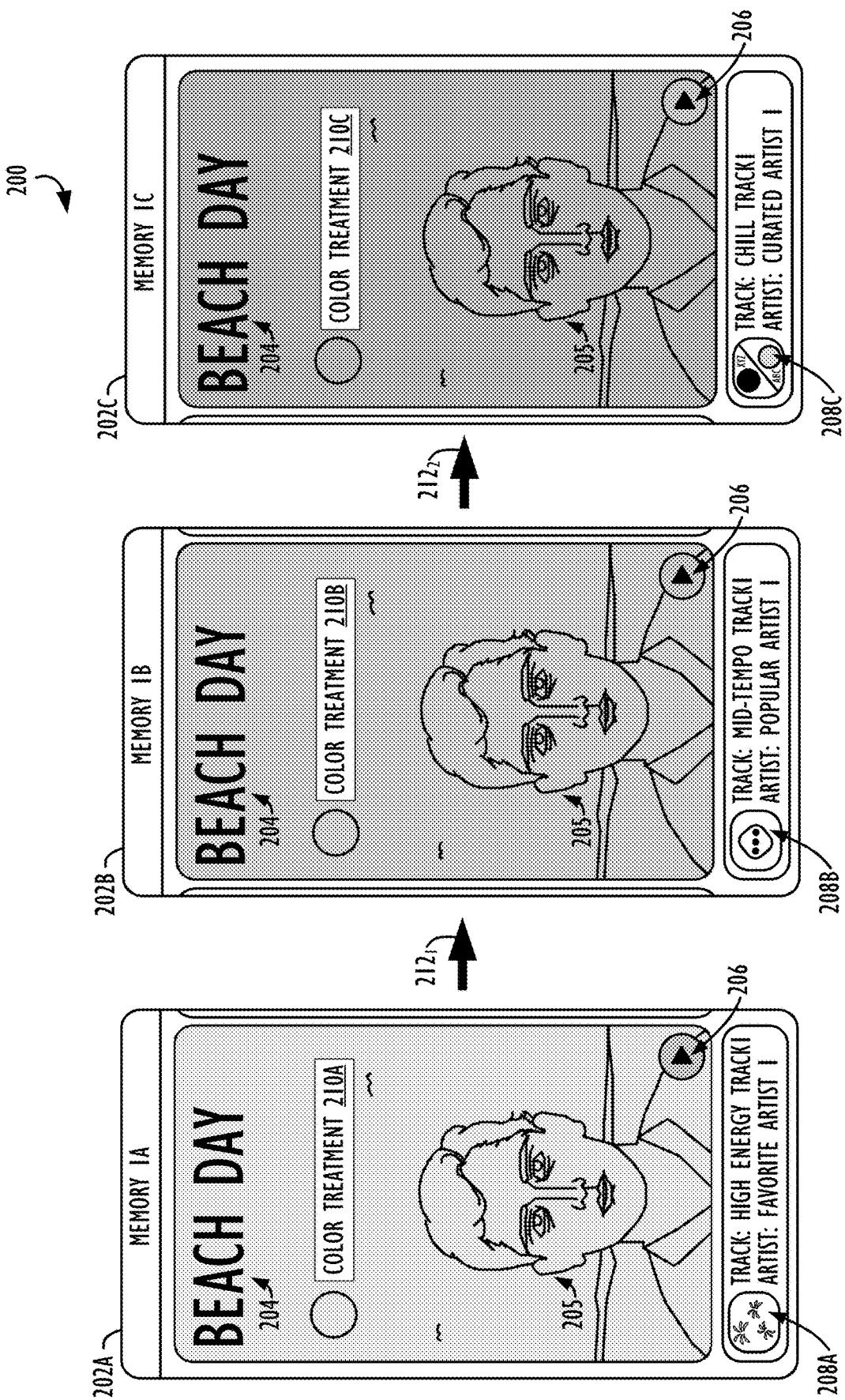
FIG. 2 illustrates an exemplary user interface for selecting a color treatment to be applied to a set of DAs to be displayed as part of a multimedia presentation with an associated audio media item, according to one or more embodiments.

Determining Color Treatments for Sets of Digital Assets Based on Characteristics of Associated Audio Media Items Turning now to FIG. 2, an exemplary user interface 200 for selecting a color treatment to be applied to a set of DAs to be displayed as part of a multimedia presentation with an associated audio media item is illustrated, according to one or more embodiments. As described above, DAM systems as described herein are capable of generating multimedia presentations (also referred to herein as "Memories" or "movies"), as well as parameters describing such multimedia presentations. In other embodiments, it is to be understood that a user may manually select the DAs to be included in a generated multimedia presentation and/or manually adjust the automatic suggestions of a DAM system of DAs to be included in a generated multimedia presentation. In some embodiments, such multimedia presentations may also be associated with one or more audio media items, e.g., one or more songs to be used as a "soundtrack" with the playback of a set of DAs that is to be included in a multimedia presentation. In some such embodiments, it may also be desirable for the DAM to determine and/or suggest one or more color treatments to be applied to the set of DAs to be displayed as part of a multimedia presentation.

As will be described in further detail herein, in some cases, the determination of a color treatment may be based, at least in part, on an audio characteristic metadata item of a respective associated audio media item. As a simple example, if a "high energy" song (e.g., in terms of tempo, genre, beats per minute, average loudness, dynamic range, etc.) is selected as a first audio media item to serve as a soundtrack for a given multimedia presentation of a set of DAs, then a warmer and/or higher contrast type of color treatment may be determined and/or suggested for the multimedia presentation. Conversely, if a "low energy" song (e.g., in terms of tempo, genre, beats per minute, average loudness, dynamic range, etc.) is selected as a first audio media item to serve as a soundtrack for the given multimedia presentation of a set of DAs, then a cooler and/or lower contrast type of color treatment may be determined and/or suggested for the multimedia presentation.

It is to be understood that "energy level" is just one type of audio characteristic that may be considered in the determination and/or suggestion of one or more appropriate color treatments for a given multimedia presentation. Other audio characteristics (which may, e.g., be stored in the form of audio characteristic metadata items associated with the audio media items) may include: an audio media item tempo characteristic; an audio media item genre characteristic; an audio media item mood characteristic; an audio media item artist characteristic; or an audio media item duration characteristic, etc. Likewise, color temperature and contrast are just two exemplary characteristics by which a color treatment may characterized. Other characteristics of color treatments (e.g., from a set of a plurality of predetermined color treatments) may include: a brightness characteristic; or a chromatic characteristic (e.g., how saturated the color treatment is, how monochromatic the color treatment is, how wide of a color gamut the color treatment utilizes, etc.).

Returning now to FIG. 2, an exemplary first determined color treatment 210A for a first version of an exemplary multimedia presentation (i.e., Memory 1A) is shown at 202A. Memory 1A 202A may comprise a caption 204 (e.g., "Beach Day"), a featured cover image 205, and a play button 206. Memory 1A 202A also has an associated audio media item 208A, with associated album artwork and metadata (e.g., an album cover art graphic, track name, artist name, album name, release year, genre, etc.). In this case, audio media item 208A comprises an exemplary "high energy" track from one of a user's favorite artists. (It is to be understood that various factors, the discussion of which is outside the scope of this application, may be considered by the DAM when selecting an appropriate audio media item(s) to suggest as a soundtrack for a particular multimedia presentation.) Then, based, at least in part, on one or more audio characteristics of audio media item 208A, the DAM may determine and/or suggest that first determined color treatment 210A is an appropriate color treatment to apply to the set of DAs to be displayed as part of the multimedia presentation along with a soundtrack of audio media item 208A. In this case, because audio media item 208A comprises an exemplary "high energy" track, first determined color treatment 210A may comprise a relatively warm color temperature and low contrast color treatment, i.e., assuming that "warm color temperature" and "low contrast" are color treatment characteristics that have been empirically (or otherwise) determined to complement high energy audio tracks well in the context of a multimedia presentation, as will be explained in further detail below with reference to FIG. 3.

Moving to the right in FIG. 2 (i.e., following arrow 2121), e.g., in response to receiving input from a user of the device displaying the Memories interface 200 indicating a desire to preview other suggested versions of Memory 202, an exemplary second determined color treatment 210B for a second version of the Memory (i.e., Memory 1B) is shown at 202B. Memory 1B 202B also has an associated audio media item 208B. In this case, audio media item 208B comprises an exemplary "mid-tempo" track from a popular artist (e.g., an artist popular in the user's area of the world and/or an artist popular at the place and time where the DAs in the Memory 202 were originally captured, etc.). Again, based, at least in part, on one or more audio characteristics of audio media item 208B, the DAM may determine and/or suggest that second determined color treatment 210B is an appropriate color treatment to apply to the set of DAs to be displayed as part of the multimedia presentation along with a soundtrack of audio media item 208B. In this case, because audio media item 208B comprises an exemplary "mid-tempo" track, second determined color treatment 210B may comprise a relatively neutral color temperature and low contrast color treatment, i.e., assuming that "neutral color temperature" and "low contrast" are color treatment characteristics that have been empirically (or otherwise) determined to complement mid-tempo audio tracks well in the context of a multimedia presentation.

Finally, moving to the right again in FIG. 2 (i.e., following arrow 2122), an exemplary third determined color treatment 210C for a third version of the Memory (i.e., Memory 1C) is shown at 202C. Memory 1C 202C also has an associated audio media item 208C. In this case, audio media item 208C comprises an exemplary "chill" track (e.g., a low energy or relaxing song) from a curated artist (e.g., an artist whose song has been hand curated by musical experts as appropriate to accompany certain multimedia presentations). Again, based, at least in part, on one or more audio characteristics of audio media item 208C, the DAM may determine and/or suggest that third determined color treatment 210C is an appropriate color treatment to apply to the set of DAs to be displayed as part of the multimedia presentation along with a soundtrack of audio media item 208C. In this case, because audio media item 208C comprises an exemplary "chill" track, third determined color treatment 210C may comprise a relatively cooler color temperature and low contrast color treatment, i.e., assuming that "cool color temperature" and "low contrast" are color treatment characteristics that have been empirically (or otherwise) determined to complement chill audio tracks well in the context of a multimedia presentation.

It is to be understood that, in other implementations, users may also have the option to manually select a desired audio media item to serve as the soundtrack for a multimedia presentation, at which point the DAM may again re-determine and suggest an appropriate color treatment(s) based on the audio media item manually selected by the user. Likewise, in some implementations, a user may also have the option to manually select a color treatment from a plurality of predetermined color treatments (and/or create or modify their own personal color treatments for application to DAs in multimedia presentations). Likewise, in still other implementations, a user may also have the option to manually select which DAs (or which portions of which DAs) are to be included in a multimedia presentations. In so doing, the overall duration of the multimedia presentation may be adjusted. Thus, the duration (and/or portion) of the selected audio media item serving as soundtrack for the multimedia presentation may also be adjusted, if desired, based on the duration and composition of the DAs in the multimedia presentation.

Figure 3:
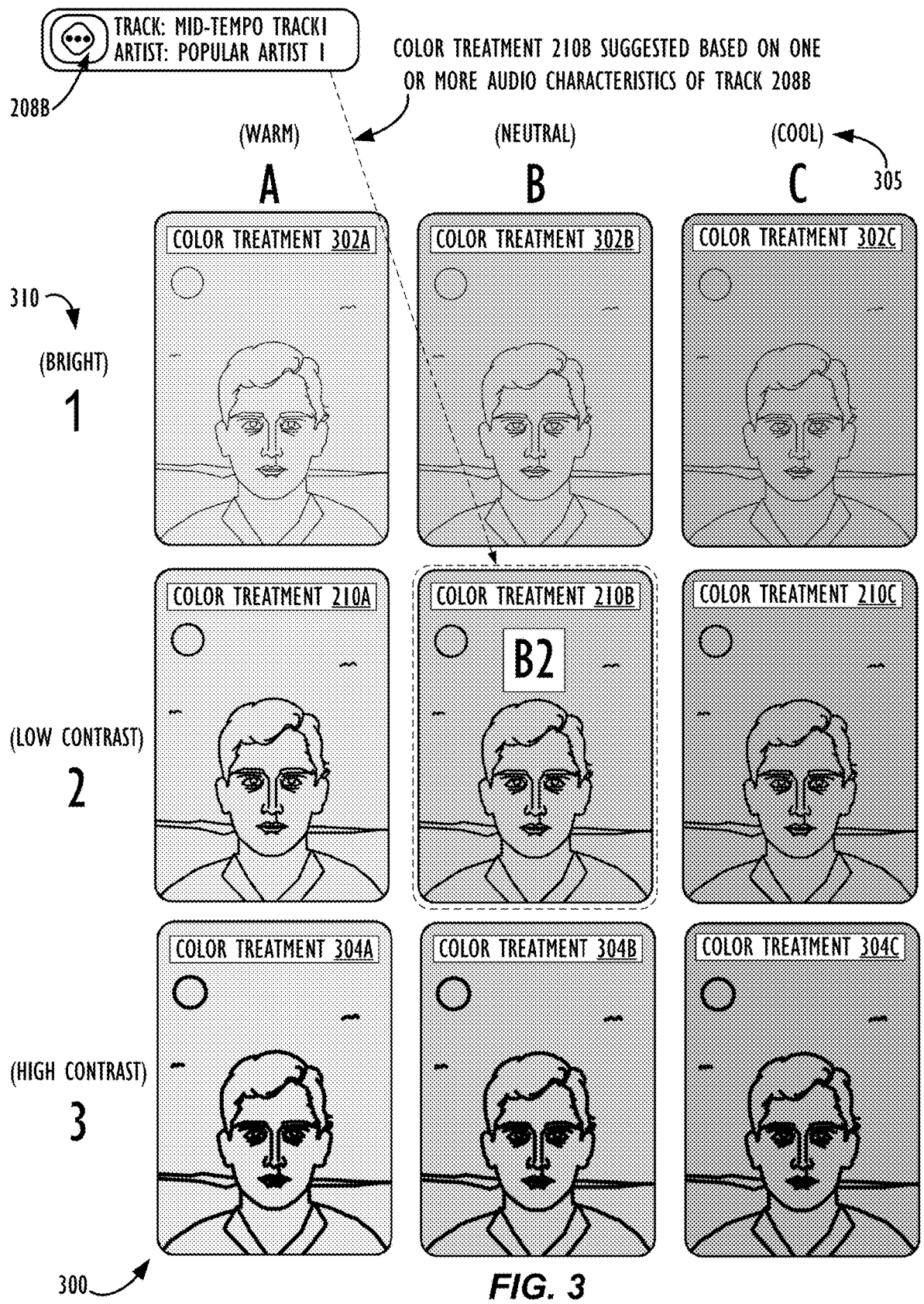
FIG. 3 illustrates a color treatment determination process based on a characteristic of a selected audio media item for a multimedia presentation of a set of DAs, according to one or more embodiments.

Turning now to FIG. 3, a color treatment determination process 300 based on a characteristic of a selected audio media item for a multimedia presentation of a set of DAs is illustrated, according to one or more embodiments. Process 300 illustrates further detail regarding the association of one or more audio characteristics of exemplary audio media item 208B from FIG. 2 with second determined color treatment 210B.

In the example of FIG. 3, the possible color treatments that may be determined or suggested by the DAM comprises a plurality of nine predetermined color treatment options. It is to be appreciated that more (or fewer) color treatment options may be possible. Further, in the example of FIG. 3, the plurality of predetermined color treatments may be categorized by two color treatment characteristics into a 2D matrix of color treatment options. First, along horizontal axis 305, the predetermined color treatments may be categorized by color temperature, e.g., with color treatments applying warmer color temperatures to DAs in the multimedia presentation shown in Column A (illustrated with lighter shading over the cover image), color treatments applying neutral color temperatures shown in Column B (illustrated with medium darkness shading over the cover image), and color treatments applying cooler color temperatures shown in Column C (illustrated with darker shading over the cover image). Likewise, along vertical axis 310, the predetermined color treatments may be categorized by contrast, e.g., with brighter color treatments shown in Row 1 (illustrated with thinner lines in the cover image), lower contrast color treatments shown in Row 2 (illustrated with medium thickness lines in the cover image), and higher contrast color treatments shown in Row 3 (illustrated with thicker lines in the cover image).

Thus, as described above and illustrated in FIG. 3, the color treatment characteristics of color treatment 210B (located at "entry" B2 in the 2D matrix of color treatment options illustrated in FIG. 3) have been empirically (or otherwise) determined to complement mid-tempo audio tracks, such as exemplary audio media item 208B, well in the context of a multimedia presentation. It is to be appreciated that more (or fewer) color treatment characteristics may be considered when determining a color treatment to suggest based on matching one or more audio characteristics of a selected audio media item that is to be used as a soundtrack to a multimedia presentation, thereby leading to higher dimensionality color treatment "matrices" (e.g., 3D, 4D, etc.) being evaluated to determine a suggested color treatment for a given selected audio media item.

In some embodiments, matching the one or more audio characteristics of a selected audio media item to one or more characteristics of the plurality of predetermined color treatments may further comprise: comparing a first audio characteristic metadata item of the selected audio media item to a corresponding one or more characteristics of the plurality of predetermined color treatments, wherein, from among the plurality of predetermined color treatments, the first audio characteristic metadata item has a highest similarity to the corresponding one or more characteristics of the color treatment that is determined to be the matching (or otherwise suggested) color treatment for the corresponding multimedia presentation.

In some cases, as described above with reference to FIG. 2, a second audio media item associated with the set of DAs may be obtained, wherein the second audio media item comprises at least a second audio characteristic metadata item (e.g., different from a first audio characteristic metadata item of a first audio media item), and a second color treatment is determined based, at least in part, on the second audio characteristic metadata item of the second audio media item. Then, the determined second color treatment (which may also be different from the first color treatment) may be applied to at least one of the digital assets of the first set of digital assets. This is also illustrated in FIG. 2, with the suggestion of color treatment 210B to go along with the version of the Memory 1B (202B), which is scored with audio media item 208B; whereas, color treatment 210C is suggested to go along with the version of the Memory 1C (202C), which is scored with audio media item 208C.

In some embodiments, applying a determined first color treatment to at least one of the digital assets of a first set of digital assets may further comprise applying one or more predetermined tone curves, color shifts, and/or monochromatic mappings corresponding to the determined first color treatment to the at least one of the digital assets of the first set of digital assets, in order to achieve the desired look and feel of the determined first color treatment for the multimedia presentation. The first color treatment may be embodied, e.g., as a three-dimensional look-up table (LUT), taking $\{R, G, B\}$ color triplets for the input pixel values and converting them into $\{R, G, B\}$ color triplets for the corresponding output (i.e., color-treated) pixel values.

Exemplary Digital Asset Layouts

Figure 4A:
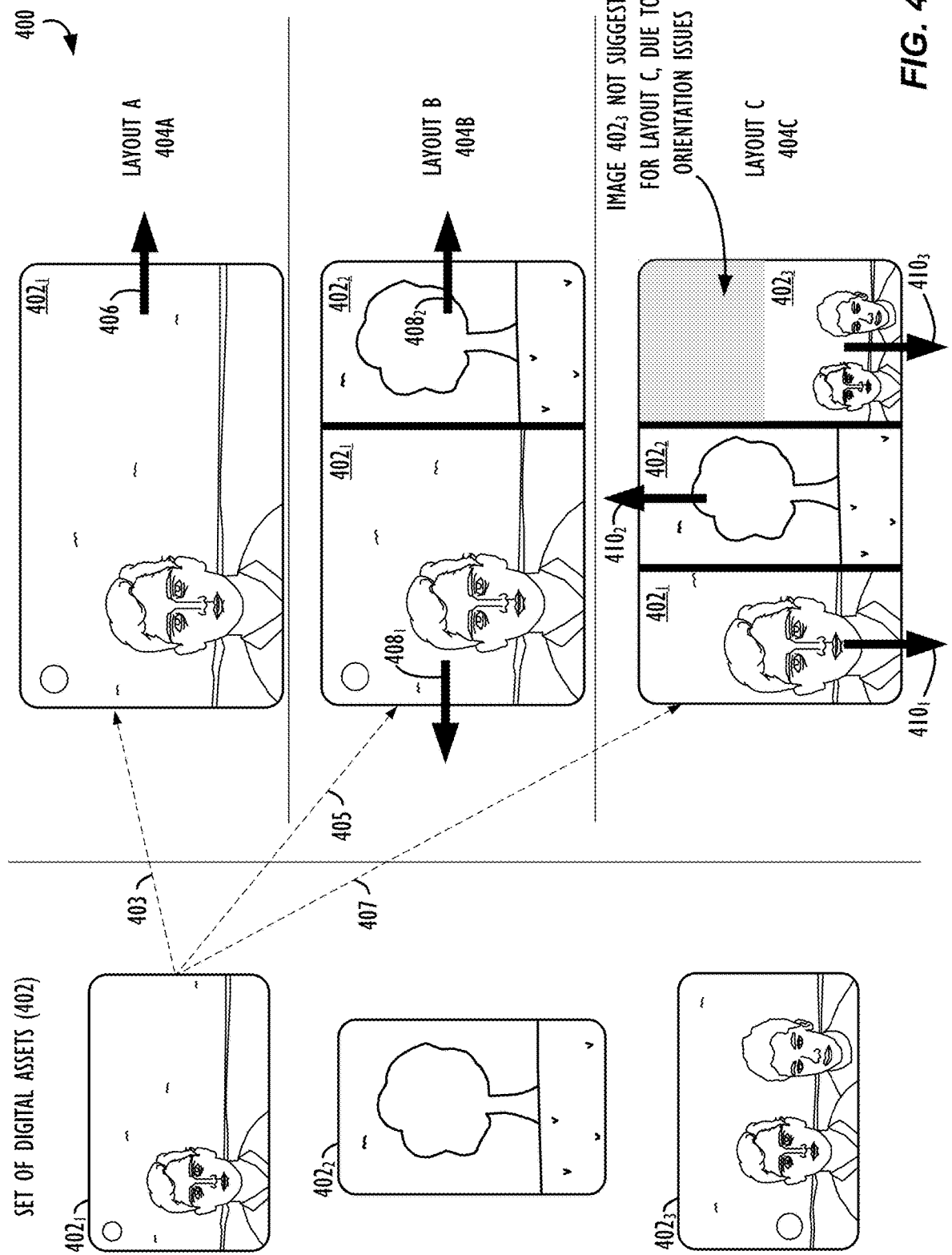
FIG. 4A illustrates examples of possible digital asset layouts for the DAs to be displayed in a multimedia presentation, according to one or more embodiments.

Turning now to FIG. 4A, examples 400 of possible digital asset layouts for the DAs to be displayed in a multimedia presentation are illustrated, according to one or more embodiments. In FIG. 4A, there is an exemplary set of digital assets 402 that comprises: a first landscape orientation image having a single subject ($402_1$), a first portrait orientation image having a nature scene of a tree ($402_2$), and a second landscape orientation image having multiple subjects ($402_3$). It is to be understood that a given set of digital assets may have many more images, as well as moving images, videos of various durations, and images of varying sizes, resolutions, dimensions and/or orientations.

According to some embodiments, multimedia presentations may comprise a sequence of DA layouts that are displayed on a display device (e.g., in conjunction with the playback of one or more audio media items, as described above), wherein each DA layout may comprise predetermined preferred clusters of one or more DAs, which are laid out in a desired pattern or arrangement, e.g., a "single image" layout (such as Layout A 404A, including only image $402_1$), a "diptych" layout with two images (such as Layout B 404B, including images $402_1$ and $402_2$), a "triptych" layout with three images (such as Layout C 404C, including images $402_1$, $402_2$, and $402_3$). In some cases, DA layouts may be preferred that are orientation agnostic, i.e., they provide a satisfactory viewing experience, no matter what orientation the display device is in during playback of the multimedia presentation.

Each DA in a given DA layout may have a preferred duration during the multimedia presentation (e.g., 0.5 seconds on screen, 1 second on screen, etc.). In the case of a DA that is a video file, some embodiments may also intelligently determine edits to the duration and/or content of individual video file, such that the video file only takes up its allotted duration in the multimedia presentation (e.g., 5 seconds), and so that a visually interesting portion of the video file (e.g., portions of the video including one or more high quality faces, a person of interest, an object(s) of interest, particular lighting or background scenery, color composition, or motion characteristics) is clipped and used for the allotted duration in the multimedia presentation. Each DA in a given DA layout may also have a preferred transition type to lead to the next DA that is to be displayed during the multimedia presentation, e.g., slide left (as illustrated by arrow 408), slide right (as illustrated by arrows 406 or $408_2$), slide up (as illustrated by arrow $410_2$), slide down (as illustrated by arrows $410_1$ or $410_3$), fade through white, fade through black, dissolve, cut, etc. Each DA in a given DA layout may also have a special treatment or effect applied to it, if desired (e.g., a rotation, zoom, pan, etc.). In some cases, the special treatment may override a default effect being otherwise applied to a DA based on the specified parameters for a given multimedia presentation.

In some cases, one or more DAs may be excluded from particular DA layouts, and/or one or more DA layouts may be excluded from a given multimedia presentation, to avoid situations where a given DA may be forced to be displayed in a visually unpleasing way during the multimedia presentation. For example, as shown in FIG. 4A, image $402_3$ has been excluded from consideration for inclusion in the right panel of a DA layout of type Layout C 404C, due to the fact that the dimensions and aspect ratio of the right panel of Layout C 404C are not conducive to a crop of image $402_3$ that would leave both human subjects visible in the crop. Another option would be to leave image $402_3$ uncropped but moved down to the bottom edge of the right panel of Layout C 404C, but this may, in turn, leave unwanted "dead space" above image $402_3$ in the DA layout. Assuming similar problems would be faced when attempting to crop image $402_3$ to fit in each of the other panels of Layout C 404C, as well, it may simply be deemed by the DAM that image $402_3$ should be excluded from consideration for inclusion in a DA layout of type Layout C 404C. By contrast, because image $402_1$ has only a single human subject, as indicated by arrows 403/405/407, it may be possible to find acceptable crops of image $402_1$ that fit into each of: the single-panel Layout A 404A; the left panel of Layout B 404B; and the left panel of Layout C 404C. Thus, it may be deemed by the DAM that image $402_1$ would be permitted to participate in any of the Layouts 404A, 404B, or 404C during a multimedia presentation.

It is to be understood that these examples are presented merely for illustrative purposes, and that many other factors or considerations may be evaluated when determining: which DAs should be clustered together (e.g., for use together in a single DA layout); which DA layouts are appropriate to use; which DAs may be used in which panels of which DA layouts; how long each DA layout should be displayed during the multimedia presentation; which portions of the content of each DA should be displayed during the multimedia presentation; and how/when each DA (or set of DAs) should be transitioned to the display of the next DA (or set of DAs) that are to be displayed in the multimedia presentation, etc.

Exemplary Digital Asset Transitions

Figure 4B:
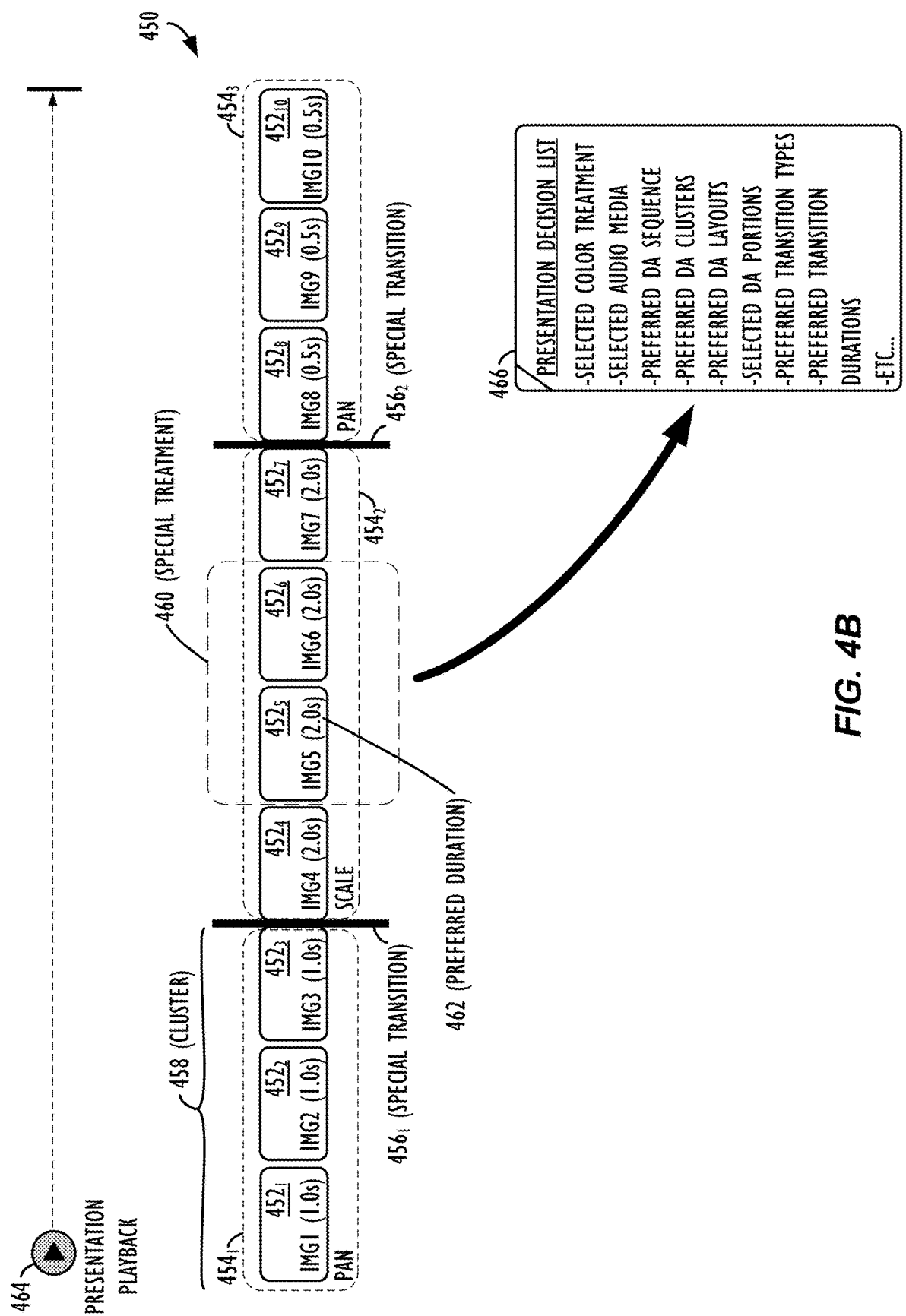
FIG. 4B illustrates examples of possible digital asset clusters, transition types, and transition durations for the DAs to be displayed in a multimedia presentation, according to one or more embodiments.

Turning now to FIG. 4B, examples 450 of possible digital asset clusters, transition types, and transition durations for the DAs to be displayed in a multimedia presentation are illustrated, according to one or more embodiments. In FIG. 4B, an exemplary set of DAs 450 comprises ten individual DAs, in this case, images $452_1$-$452_{10}$. As illustrated, DAs 452 have been grouped into three clusters 458 (i.e., images $452_1$-$452_3$ in a first cluster, images $452_4$-$452_7$ in a second cluster, and images $452_8$-$452_{10}$ in a third cluster). DAs may be placed into clusters for any number of reasons, e.g., based on having related content, coming from a related moment in a user's metadata network, all having an image of a particular person, location, or scene, or even based on their orientations and/or dimensions working well together for a particular DA layout, and so forth. Each cluster of DAs may have one or more preferred effects applied to them during the multimedia presentation, e.g., a panning effect $454_1$ being applied to images $452_1$-$452_3$ in the first cluster, a scaling effect $454_2$ being applied to images $452_4$-$452_7$ in the second cluster, and another (possibly different) panning effect $454_3$ being applied to images $452_8$-$452_{10}$ in the third cluster. Each DA (or cluster of DAs) may also have a preferred duration 462 for which they are displayed during the multimedia presentation. Further, as mentioned above, each DA may also have a special treatment or effect 460 applied to it, if desired (e.g., a rotation, zoom, pan, etc.). In some cases, the special treatment may override a default effect being otherwise applied to a DA based on the specified parameters for a given multimedia presentation.

In some cases, one or more special transitions (e.g., as shown at $456_1$ and $456_2$) may also be applied between particular DAs in the multimedia presentation. As one example, when the topics or content of the images in a multimedia presentation make a significant change (e.g., if images $452_1$-$452_3$ from the first cluster were captured in 2018, images $452_4$-$452_7$ from the second cluster were captured in 2019, and images $452_8$-$452_{10}$ from the third cluster were captured in 2020), then a more dramatic (or longer lasting) transition (e.g., a fade to black, fade through white, etc.) could be applied between those clusters of DAs than would be preferred or selected for application between other clusters of DAs that perhaps did not exhibit as significant of changes between one another.

Thus, as may now be understood, the preferred DA and/or transition durations, preferred transition types, preferred DA layouts, and/or preferred sequencing of DAs (or, indeed, the included DAs themselves and/or the particular portions thereof) may be determined for the multimedia presentation based, at least in part, on the one or more audio characteristic metadata items of the selected audio media item for the multimedia presentation. For example, a larger number of more rapid DA transitions may be more appropriate to accompany a higher energy audio media item soundtrack for a multimedia presentation, whereas a smaller number of more gradual DA transitions may be more appropriate to accompany a lower energy or chill audio media item soundtrack for a multimedia presentation. Further, in some implementations, the preferred timing and/or style of transitions between DAs in a multimedia presentation may be based, at least in part, on the content of the selected audio media item soundtrack for the multimedia presentation. For example, it may be desirable to synchronize the transitions between certain DAs with the beat of the audio media item and/or save special transitions and/or special treatments of DAs for the most important or impactful moments of music within an audio media item. As another example, the duration and/or composition (i.e., which particular portion) of the audio media item may dynamically change based on the duration and/or content of the multimedia presentation.

It is also to be understood that, in some embodiments, the preferred DA and/or transition durations, preferred transition types, preferred DA layouts, and/or preferred sequencing of DAs (or, indeed, the included DAs themselves) may also be altered on-the-fly during playback 464 of the multimedia presentation by a user (e.g., by a user holding down a finger or mouse click on a particular DA to "pause" the preferred presentation sequence of DAs until the user lifts their finger or releases the mouse click—even while the audio soundtrack for the multimedia presentation may continue to play while the display sequence of the DAs is frozen), hence their designation as "preferred" characteristics at certain places herein. In some embodiments, the determined one or more parameters for the multimedia presentation may be exported by the DAM in the form of a so-called presentation decision list 466 to a multimedia presentation playback engine, which multimedia presentation playback engine is configured to implement and render the various preferences expressed in the presentation decision list, unless or until one or more preferences are overridden by a user (or become impossible for the playback engine to implement for some other reason, such as device capabilities or orientation). Characteristics of the multimedia presentation specified in the presentation decision list 466 may comprise one or more of: the selected color treatment for the multimedia presentation, the selected audio media item (including, optionally, an indication of a volume level that the audio media item should be mixed in to the multimedia presentation at, e.g., as foreground music, background music, attenuated when a video DA is playing back its own audio during the presentation, etc.), the preferred DA sequence, preferred DA clusters, preferred DA layouts, preferred transition types, or preferred transition durations, as well as which DAs (or portions thereof) to even include in the multimedia presentation (e.g., in the event that a user wishes to remove or add a specific DA, or portion thereof, from the multimedia presentation).

Figure 5:
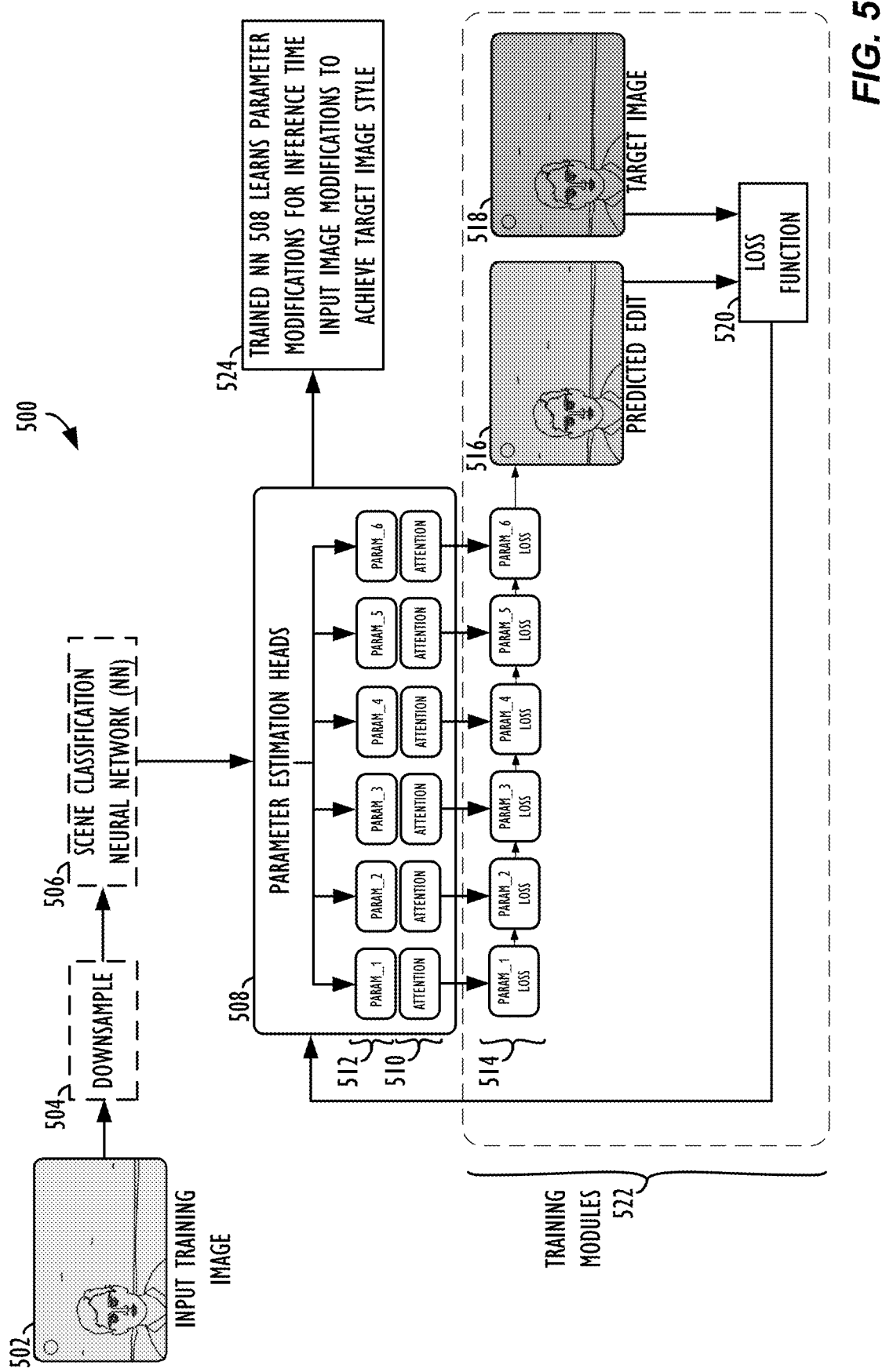
FIG. 5 illustrates an exemplary deep neural network (DNN) architecture for a network trained to learn image parameter modifications to apply to an image to approximate a target style, according to one or more embodiments.

Exemplary Deep Neural Network Architecture for Performing Color Normalization Operations Turning now to FIG. 5, an exemplary deep neural network (DNN) architecture 500 for a network trained to learn image parameter modifications to apply to an image, in order to approximate a target style is illustrated, according to one or more embodiments. Input training image 502 represents an exemplary unmodified image that may be used during the training process for the exemplary DNN illustrated in FIG. 5. Target image 518 represents a version of training image 502 that has been modified to have a first target style (e.g., a color neutral style, a low contrast style, a style that is reflective of a particular professional photographer, etc.). As will be understood, by using a DNN, such as is shown in DNN architecture 500, to apply a similar target style to each DA in a set of DAs that is to be displayed in multimedia presentation, the color differences between the individual DAs in the set of DAs (e.g., differences due to the DAs within a set of DAs being captured at different times, by different cameras, under different lighting conditions, subjected to differing post-processing color treatments, etc.) may be normalized. Color normalizing a set of DAs in a similar fashion to one another prior to the application of a common color treatment can lead to a more consistent set of results and a more cohesive and/or visually-pleasing look and feel to a generated multimedia presentation including the color treated DAs.

According to some embodiments, input training image 502 may first be downsampled (504) to a desired smaller resolution, e.g., in order to save processing/thermal resources and/or to simplify and speed up downstream processing by the DNN(s). In some architectures, the input image may first be applied to all or a portion of a pre-trained scene classification neural network (NN) 506, which may be trained to identify or classify certain aspects of the scenes represented in input training images, such as input training image 502, and which may provide information, e.g., in the form of a matrix of values, representative of the identified scene, which may be leveraged by other parts of the DNN architecture to speed up the training process and/or allow the training process to work with less training data.

Next, the information output from scene classification NN 506 may be input to the DNN 508 that is being trained in the example illustrated in FIG. 5. In particular, DNN 508 may be trained to determine one or more parameter estimation heads 512, such as Param_1 through Param_6 shown in FIG. 5, wherein, e.g., one image parameter modification may be estimated for each of image parameter of a set of image parameters that the DNN 508 is attempting to learn how to modify, in order to cause input images to approximate the target image style when the DNN is applied to images at inference time. In some cases, the DNN 508 may be further configured to determine an attention map 510 (i.e., a 2D image map of values indicating the regions of the input image where the modifications related to a respective image parameter are applicable, e.g., a parameter estimation head related to a black point image parameter may focus on the very dark regions within an input image since they are the most relevant to black point modifications, and so forth) for one or more of the parameters in the set of image parameters, which may be used to aid in the training process. In some cases, the set of image parameters for which image parameter modifications are determined by the DNN may comprise one or more of: a white balance parameter; a local light parameter; an exposure parameter; a black point parameter; a highlight parameter; a contrast parameter; a vibrancy parameter; or a color tint parameter. As will be understood, any desired set of image parameters may be used in a given implementation.

During training, one or more training modules 522 may be employed by the network. For example, an image parameter loss term 514 may be determined for one or more of the learned image parameters in the set of image parameters. In some cases, one or more image parameter loss terms may be combined to form a combined image parameter loss term. During each round of training, a predicted edit 516 image version of the input training image 502 may be generated, i.e., by applying the one or more of the estimated image parameter modifications for the image parameters that the DNN 508 is attempting to learn to the input training image 502. A training image loss function value 520 may then be computed for the input training image 502, based on a calculated difference between the predicted edit image version 516 and the corresponding "ground truth" target image 518, i.e., the version of the input image that has been manually modified to have the desired target image style. The loss function output may then be backpropagated all the way through the DNN to update the weights, and the training process may continue until the DNN converges to an acceptable loss function value.

As may now be appreciated, at block 524, the trained DNN 508 has learned how to make image parameter modifications to input images at inference time in order to modify the input images to achieve the target image style. Assuming, as in this example, that the target image style is a color neutral image style, then applying the DNN architecture 500 to DAs in a set of DAs that are to be displayed in multimedia presentation can color normalize the DAs, effectively bringing them into a common connection "color space" before any further color treatment operations are to be applied to the DAs, such that any further color treatment operations result in a consistent color look and feel across the DAs in the set of DAs.

In some embodiments, the determined set of image parameter modifications for a given input image may be stored in a memory separately from the image. In other embodiments, the determined set of image parameter modifications for a given input image may be stored in the metadata of the image. These storage options may allow for the image modifications determined by the DNN to be applied at a later time, applied on-demand (e.g., only when a image is being displayed as a part of a color treated multimedia presentation), and/or removed from the image (e.g., if initially applied by a user who later prefers to apply their own image color modifications to an image). In some embodiments, the image modifications determined by the DNN may be applied in a single operation, i.e., along with any other color treatment operations being applied to the image, e.g., in the form of a single three-dimensional LUT, configured to perform both color normalization and color treatment operations.

In some embodiments, other types of loss functions may be applied at block 520 (or other places throughout the DNN). For example, the DNN may be further trained using a loss function based on determining a difference in chromaticity of skin tone pixels in an input training image and a canonical skin tone chromaticity point(s). In other examples, the DNN may be further trained using a loss function based on determining a difference in the amount of green (or magenta) tint in pixels in the input training image and canonical amounts of green (or magenta) tint, respectively, expected in pixels of typical (e.g., properly color-corrected) captured images.

As may be understood, at inference time, each of a first DA in a set of DAs, as well as a second one or more DAs from the set of DAs may be applied to the DNN, either in sequential order or parallel, wherein the DNN is configured to determine and apply a set of image parameter modifications for the set of image parameters to each DA in the set of DAs. As described above, once each DA in the set of DAs has been color normalized based on application of the outputs of the DNN, a determined color treatment may sagely be applied to each DA in the set of DAs.

Figure 6A:
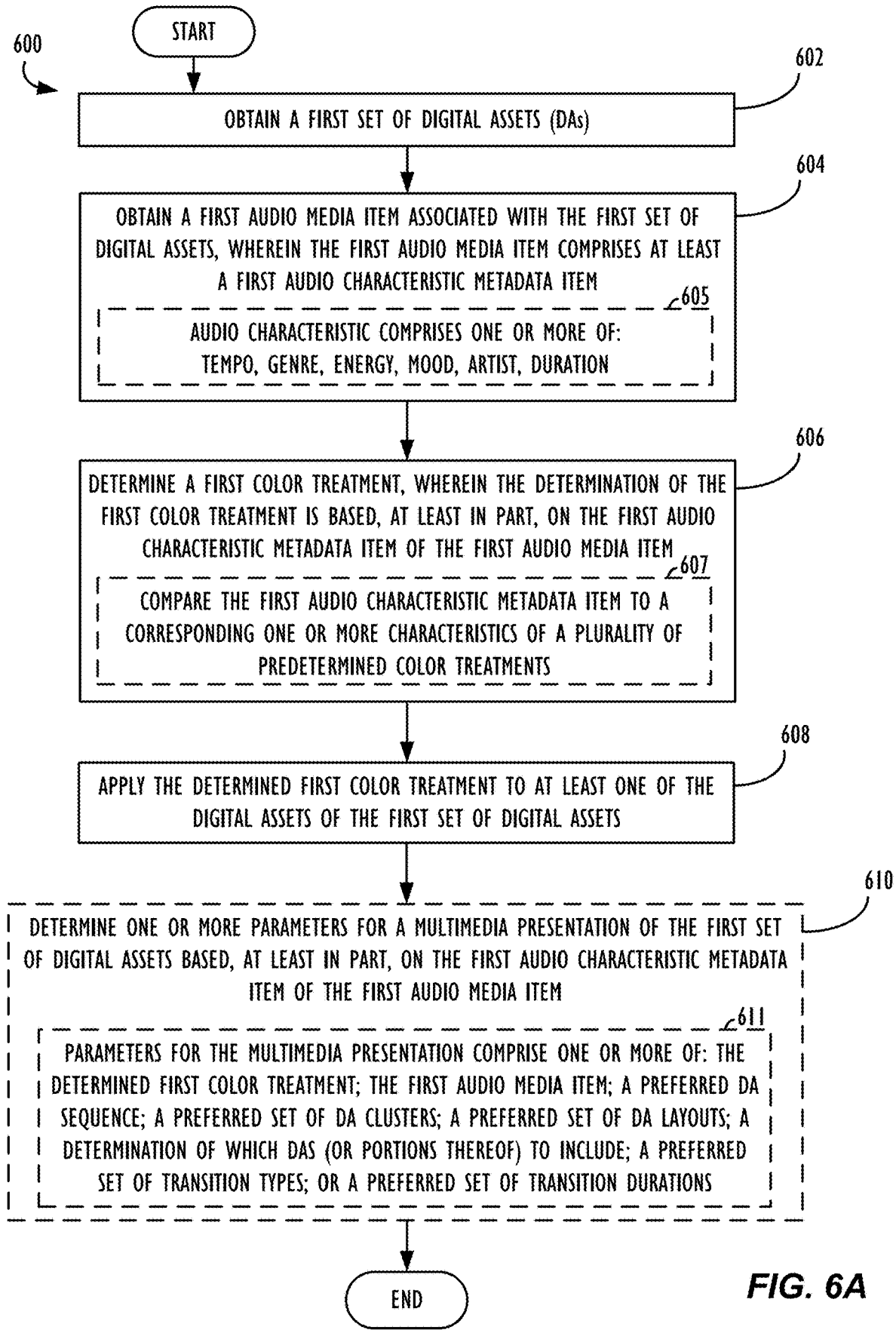
FIG. 6A is a flow chart illustrating a method of determining a color treatment for a set of DAs based on a characteristic of an associated audio media item, according to various embodiments.

Exemplary Methods for Performing Digital Asset Color Treatments, Color Normalization, and Determining Parameters for Multimedia Presentations of Sets of Digital Assets Turning now to FIG. 6A, a flow chart is shown, illustrating a method 600 of determining a color treatment for a set of DAs based on a characteristic of an associated audio media item, according to various embodiments. First, at Step 602 the method 600 may obtain a first set of digital assets. Next, at Step 604 the method 600 may obtain a first audio media item associated with the first set of digital assets, wherein the first audio media item comprises at least a first audio characteristic metadata item. In some cases, the audio characteristic metadata may comprise one or more of: tempo, genre, energy, mood, artist, duration (Step 605). Next, at Step 606 the method 600 may determine a first color treatment, wherein the determination of the first color treatment is based, at least in part, on the first audio characteristic metadata item of the first audio media item. In some cases, the determination of the first color treatment may further comprise comparing the first audio characteristic metadata item to a corresponding one or more characteristics of a plurality of predetermined color treatments (Step 607). Next, at Step 608 the method 600 may apply the determined first color treatment to at least one of the digital assets of the first set of digital assets. In some cases, as described below with reference to FIG. 6C, a color normalization operation may be applied to the first set of digital assets prior to the application of the determined first color treatment. Finally, at Step 610 the method 600 may determine one or more parameters for a multimedia presentation of the first set of digital assets based, at least in part, on the first audio characteristic metadata item of the first audio media item. In some cases, the parameters for the multimedia presentation may comprise one or more of: the determined first color treatment; the first audio media item; a preferred DA sequence; a preferred set of DA clusters; a preferred set of DA layouts; a determination of which DAs (and portions thereof) to include in the multimedia presentation; a preferred set of transition types; or a preferred set of transition durations (Step 611).

Figure 6B:
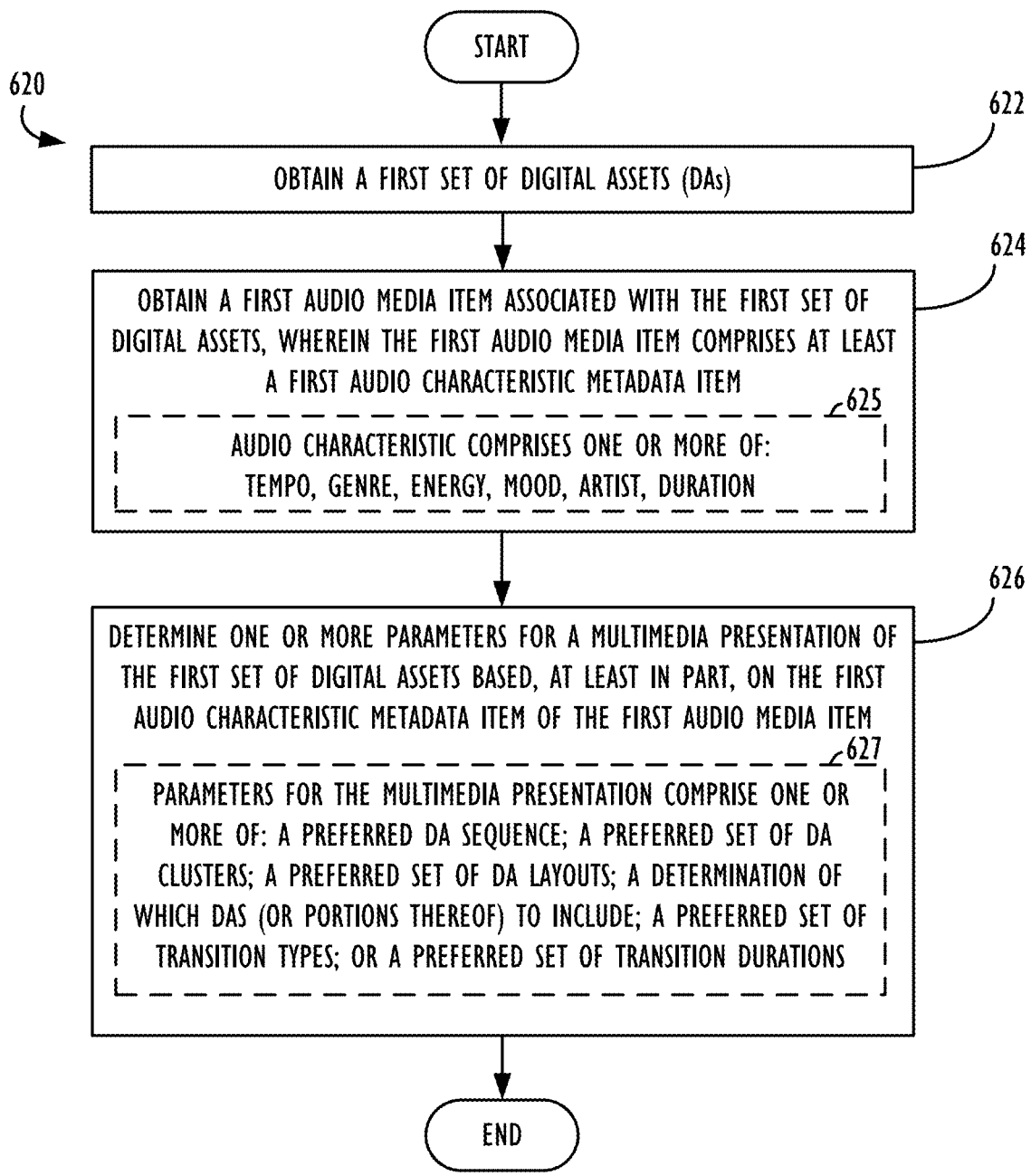
FIG. 6B is a flow chart illustrating a method of determining one or more parameters for a multimedia presentation of a set of DAs based on a characteristic of an associated audio media item, according to various embodiments.

Turning now to FIG. 6B, a flow chart is shown, illustrating a method 620 of determining one or more parameters for a multimedia presentation of a set of DAs based on a characteristic of an associated audio media item, according to various embodiments. First, at Step 622 the method 600 may obtain a first set of digital assets. Next, at Step 624 the method 620 may obtain a first audio media item associated with the first set of digital assets, wherein the first audio media item comprises at least a first audio characteristic metadata item. In some cases, the audio characteristic metadata may comprise one or more of: tempo, genre, energy, mood, artist, duration (Step 625). Finally, at Step 626 the method 620 may determine one or more parameters for a multimedia presentation of the first set of digital assets based, at least in part, on the first audio characteristic metadata item of the first audio media item. In some cases, the parameters for the multimedia presentation may comprise one or more of: a preferred DA sequence; a preferred set of DA clusters; a preferred set of DA layouts; a determination of which DAs (and portions thereof) to include in the multimedia presentation; a preferred set of transition types; or a preferred set of transition durations (Step 627).

Figure 6C:
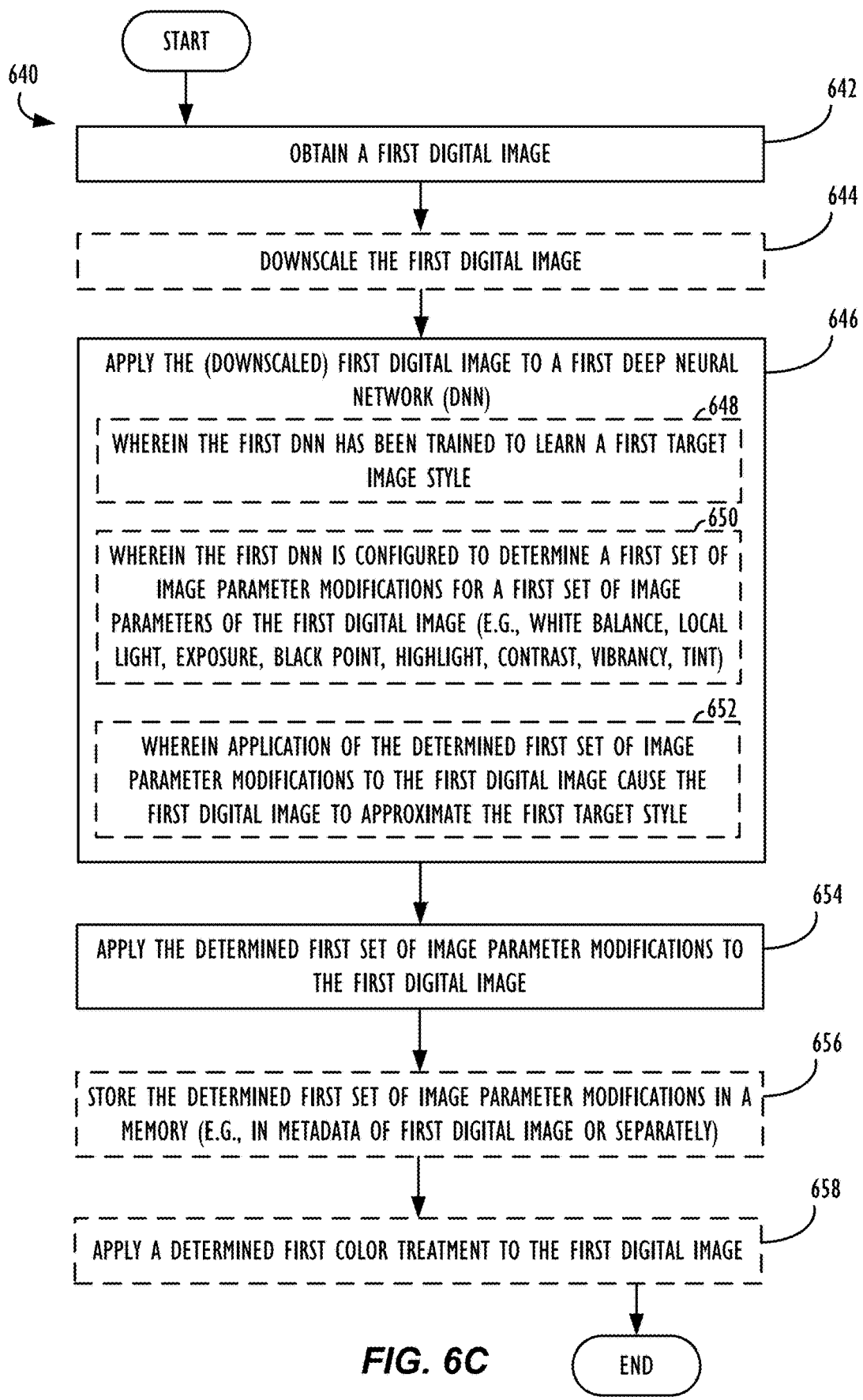
FIG. 6C is a flow chart illustrating a method of using a DNN trained to learn image parameter modifications to apply to an image to approximate a target style, according to various embodiments.

Turning now to FIG. 6C, a flow chart is shown, illustrating a method 640 of using a DNN trained to learn image parameter modifications to apply to an image to approximate a target style, according to various embodiments. First, at Step 642 the method 640 may obtain a first digital image. Next, at Step 644 the method 640 may optionally downscale the first digital image, e.g., to improve the performance and/or lessen the amount of processing resources required to apply a DNN to the first digital image data. Next, at Step 646 the method 640 may apply the (optionally downscaled) first digital image to a first Deep Neural Network (DNN). In some cases, the first DNN may have been trained to learn a first target image style (Step 648). In other cases, the first DNN may be configured to determine a first set of image parameter modifications for a first set of image parameters of the first digital image (e.g., white balance, local light, exposure, black point, highlight, contrast, vibrancy, tint) (Step 650). In other cases, the application of the determined first set of image parameter modifications to the first digital image cause the first digital image to approximate the first target style (Step 652).

Next, at Step 654 the method 640 may apply the determined first set of image parameter modifications to the first digital image, i.e., in order to color normalize the content of the first digital image. In some cases, the determined first set of image parameter modifications may also optionally be stored in a memory (e.g., in metadata of first digital image or separately) (Step 656), such that the modifications could be applied, removed, and/or re-applied at a later time in on or more editing applications. In some cases, once the first digital image is color normalized, the method 640 may optionally apply a determined first color treatment to the first digital image (Step 658), e.g., as described above with reference to FIG. 6A.

It is to be understood that the operations of method 640 may likewise be applied to a single digital image or to multiple digital images, e.g., to each DA in a set of DAs to be included in a multimedia presentation, either serially or in parallel, so that the color properties of all DAs in the set of DAs are normalized with one another before the application of a common determined color treatment to the set of DAs. Color-normalizing a set of DAs in a similar fashion prior to the application of a common color treatment can lead to a more consistent set of results and a more cohesive and/or visually-pleasing look and feel to a generated multimedia presentation including the color treated DAs.

Exemplary Electronic Computing Devices

Figure 7:
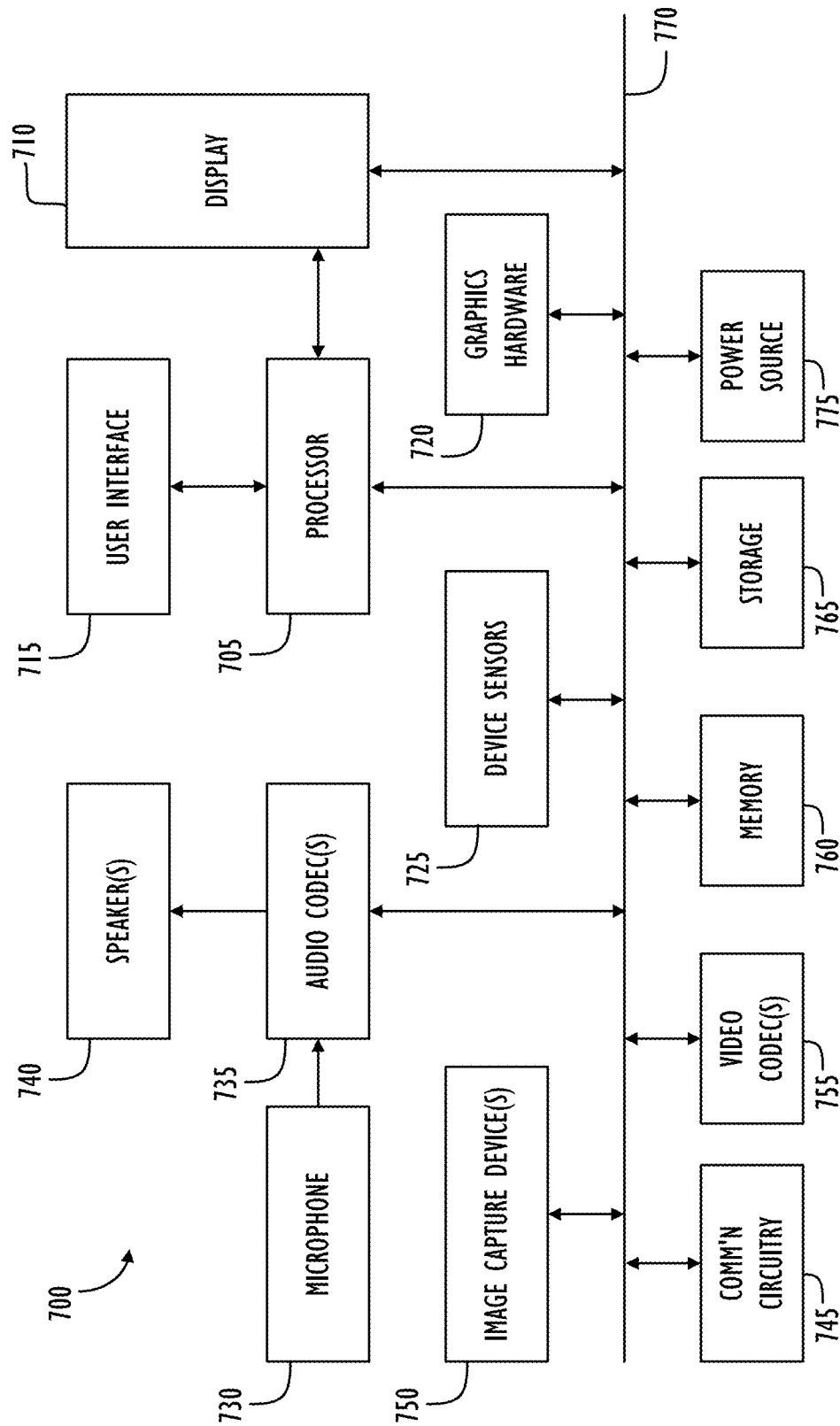
FIG. 7 is a block diagram illustrating a programmable electronic computing device, in which one or more of the techniques disclosed herein may be implemented.

Referring now to FIG. 7, a simplified functional block diagram of illustrative programmable electronic computing device 700 is shown according to one embodiment. Electronic device 700 could be, for example, a mobile telephone, personal media device, portable camera, or a tablet, notebook or desktop computer system. As shown, electronic device 700 may include processor 705, display 710, user interface 715, graphics hardware 720, device sensors 725 (e.g., proximity sensor/ambient light sensor, accelerometer, inertial measurement unit, and/or gyroscope), microphone 730, audio codec(s) 735, speaker(s) 740, communications circuitry 745, image capture device 750, which may, e.g., comprise multiple camera units/optical image sensors having different characteristics or abilities (e.g., Still Image Stabilization (SIS), HDR, OIS systems, optical zoom, digital zoom, etc.), video codec(s) 755, memory 760, storage 765, and communications bus 770.

Processor 705 may execute instructions necessary to carry out or control the operation of many functions performed by electronic device 700 (e.g., such as the generation and/or processing of images in accordance with the various embodiments described herein). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 710 may display a video stream as it is captured while processor 705 and/or graphics hardware 720 and/or image capture circuitry contemporaneously generate and store the video stream in memory 760 and/or storage 765. Processor 705 may be a system-on-chip (SOC) such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 750 may comprise one or more camera units configured to capture images, e.g., images which may be processed to generate color-treated versions of said captured images, e.g., in accordance with this disclosure. Output from image capture device 750 may be processed, at least in part, by video codec(s) 755 and/or processor 705 and/or graphics hardware 720, and/or a dedicated image processing unit or image signal processor incorporated within image capture device 750. Images so captured may be stored in memory 760 and/or storage 765. Memory 760 may include one or more different types of media used by processor 705, graphics hardware 720, and image capture device 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

Memory 760 and storage 765 may be used to retain computer program instructions or code organized into one or more modules and written in any desired computer programming language. When executed by, for example, processor 705, such computer program code may implement one or more of the methods or processes described herein. Power source 775 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 700.

As described above, one aspect of the present technology is the gathering and use of data available from various sources to improve the delivery to users of content-related suggestions. The present disclosure contemplates, that in some instances, this gathered data may include personal information data that uniquely identifies or can be used to contact or locate a specific person. Such personal information data can include demographic data, location-based data, telephone numbers, email addresses, social media handles, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content-related suggestions that are of greater interest and/or greater contextual relevance to the user. Accordingly, use of such personal information data enables users to have more streamlined and meaningful control of the content that they view and/or share with others. Further, other uses for personal information data that benefit the user are also contemplated by the present disclosure. For instance, health and fitness data may be used to provide insights into a user's general wellness, or state of well-being during various moments or events in their lives.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content-related suggestion services, the present technology can be configured to allow users to select to "opt in" or "opt out" of participation in the collection of personal information data during registration for services or anytime thereafter. In another example, users can select not to provide their content and other personal information data for improved content-related suggestion services. In yet another example, users can select to limit the length of time their personal information data is maintained by a third party, limit the length of time into the past from which content-related suggestions may be drawn, and/or entirely prohibit the development of a knowledge graph or other metadata profile. In addition to providing "opt in" and "opt out" options, the present disclosure contemplates providing notifications relating to the access or use of personal information. For instance, a user may be notified, upon downloading an "App," that their personal information data will be accessed and then reminded again just before personal information data is accessed by the App.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, such as within certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be suggested for use by users by inferring preferences based on non-personal information data or a bare minimum amount of personal information, such as the quality level of the content (e.g., focus, exposure levels, musical quality or suitability, etc.) or the fact that certain content is being requested by a device associated with a contact of the user, other non-personal information available to the DAM system, or publicly available information.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory;
   a display; and
   one or more processors operatively coupled to the memory, wherein the one or more processors are configured to execute instructions causing the one or more processors to:
   obtain a first set of digital assets, wherein the first set of digital assets comprises two or more distinct digital assets that are associated together via a knowledge graph metadata network;
   obtain a first audio media item associated with the first set of digital assets, wherein the first audio media item comprises at least a first audio characteristic metadata item;
   determine a first color treatment, wherein the determination of the first color treatment is based, at least in part, on the first audio characteristic metadata item of the first audio media item;
   apply the determined first color treatment to at least one of the digital assets of the first set of digital assets; and
   determine one or more parameters for a multimedia presentation of the first set of digital assets based, at least in part, on the first audio characteristic metadata item of the first audio media item, wherein one of the one or more parameters for the multimedia presentation comprises a preferred set of digital asset clusters for the digital assets of the first set of digital assets in the multimedia presentation.

2. The device of claim 1, wherein the first audio characteristic metadata item of the first audio media item comprises one or more of:
   an audio media item tempo characteristic;
   an audio media item genre characteristic;
   an audio media item energy characteristic;
   an audio media item mood characteristic;
   an audio media item artist characteristic; or
   an audio media item duration characteristic.

3. The device of claim 1, wherein the instructions causing the one or more processors to apply the determined first color treatment to at least one of the digital assets of the first set of digital assets further comprise instructions to:
   apply one or more predetermined tone curves corresponding to the determined first color treatment to the at least one of the digital assets of the first set of digital assets.

4. The device of claim 1, wherein the instructions causing the one or more processors to determine the first color treatment based, at least in part, on the first audio characteristic metadata item of the first audio media item further comprise instructions to:
   compare the first audio characteristic metadata item of the first audio media item to a corresponding one or more characteristics of a plurality of predetermined color treatments,
   wherein the plurality of predetermined color treatments includes the first color treatment, and
   wherein, from among the plurality of predetermined color treatments, the first audio characteristic metadata item has a highest similarity to the corresponding one or more characteristics of the first color treatment.

5. The device of claim 4, wherein the one or more characteristics of the plurality of predetermined color treatments comprises one or more of:
   a brightness characteristic;
   a contrast characteristic;
   a color temperature characteristic; or
   a chromatic characteristic.

6. The device of claim 1, wherein the one or more processors are further configured to execute instructions causing the one or more processors to:
   determine a preferred set of transition types to be used for the digital assets of the first set of digital assets in the multimedia presentation,
   wherein the determination of the preferred set of transition types is based, at least in part, on the first audio characteristic metadata item.

7. The device of claim 1, wherein the one or more processors are further configured to execute instructions causing the one or more processors to:
   determine a preferred set of transition durations to be used for the digital assets of the first set of digital assets in the multimedia presentation,
   wherein the determination of the preferred set of transition durations is based, at least in part, on the first audio characteristic metadata item.

8. The device of claim 1, wherein the one or more processors are further configured to execute instructions causing the one or more processors to:
   obtain a second audio media item associated with the first set of digital assets, wherein the second audio media item comprises at least a second audio characteristic metadata item;
   determine a second color treatment, wherein the determination of the second color treatment is based, at least in part, on the second audio characteristic metadata item of the second audio media item; and
   apply the determined second color treatment to at least one of the digital assets of the first set of digital assets,
   wherein the first color treatment is different from the second color treatment.

9. An image processing method, comprising:
   obtaining a first digital image;
   applying the first digital image to a first deep neural network (DNN), wherein the first DNN has been trained to learn a first target image style, wherein the first DNN is configured to determine a first set of image parameter modifications for a first set of image parameters of the first digital image, and wherein application of the determined first set of image parameter modifications to the first digital image would cause the first digital image to approximate the first target style; and
   applying the determined first set of image parameter modifications to the first digital image, wherein the determined first set of image parameter modifications are applied to the first digital image by a computer program executed by a processing unit and are not applied by the first DNN.

10. The method of claim 9, wherein the first DNN has been further trained using a loss function based on determining a difference in chromaticity of skin tone pixels in the first digital image and a canonical skin tone chromaticity point.

11. The method of claim 9, wherein the first DNN has been further trained using a loss function based on determining a difference in green or magenta tint in pixels in the first digital image and canonical amounts of green or magenta tint, respectively, expected in pixels of captured images.

12. The method of claim 9, wherein the first DNN is further configured to determine an attention map for each of the first set of image parameters.

13. The method of claim 9, further comprising:

obtaining a second one or more digital images, wherein the first digital image and the second one or more digital images comprise a first set of digital images;

applying each of the second one or more digital images to the first DNN, wherein the first DNN is configured to determine a second set of image parameter modifications for the first set of image parameters for each of the second one or more digital images, and wherein application of each of the determined second sets of image parameter modifications, respectively, to the second one or more digital images would cause each of the second one or more digital images to more closely approximate the first target style; and applying each of the determined second sets of image parameter modifications, respectively, to the second one or more digital images.

14. An image processing method, comprising:

obtaining a first set of digital assets, wherein the first set of digital assets comprises two or more distinct digital assets that are associated together via a knowledge graph metadata network;

obtaining a first audio media item associated with the first set of digital assets, wherein the first audio media item comprises at least a first audio characteristic metadata item; and determining one or more parameters for a multimedia presentation of the first set of digital assets based, at least in part, on the first audio characteristic metadata item of the first audio media item, wherein one of the one or more parameters for the multimedia presentation comprises a preferred set of digital asset clusters for the digital assets of the first set of digital assets in the multimedia presentation.

15. The method of claim 14, wherein the one or more parameters for the multimedia presentation of the first set of digital assets comprise one or more of:

a preferred set of digital asset layouts for the digital assets of the first set of digital assets in the multimedia presentation;

a portion of a digital asset of the first set of digital assets to include in the multimedia presentation;

a preferred set of transition types to be used for the digital assets of the first set of digital assets in the multimedia presentation; or a preferred set of transition durations to be used for the digital assets of the first set of digital assets in the multimedia presentation.

16. The method of claim 14, further comprising:

determining a preferred set of digital asset layouts for the digital assets of the first set of digital assets in the multimedia presentation, wherein the determination of the preferred set of digital asset layouts is based, at least in part, on the first audio characteristic metadata item.

17. The method of claim 14, further comprising:

determining a preferred set of transition types to be used for the digital assets of the first set of digital assets in the multimedia presentation, wherein the determination of the preferred set of transition types is based, at least in part, on the first audio characteristic metadata item.

18. The method of claim 14, further comprising:

determining a first color treatment, wherein the determination of the first color treatment is based, at least in part, on the first audio characteristic metadata item of the first audio media item; and applying the determined first color treatment to at least one of the digital assets of the first set of digital assets.

* * * * *